United States Patent [19]

Oshima

[11] Patent Number: 5,043,615
[45] Date of Patent: Aug. 27, 1991

[54] NONCONTACT BEARING UTILIZING MAGNETISM

[75] Inventor: Shintaro Oshima, Musashino, Japan

[73] Assignees: Shibasoku Co., Ltd.; Asaca Corporation, both of Tokyo, Japan

[21] Appl. No.: 562,585

[22] Filed: Aug. 3, 1990

[30] Foreign Application Priority Data

Aug. 14, 1989 [JP] Japan .................................. 1-209831
May 23, 1990 [JP] Japan .................................. 2-133242

[51] Int. Cl.$^5$ ............................................. F16C 39/06
[52] U.S. Cl. ..................................... 310/90.5; 310/152
[58] Field of Search ....................... 310/90.5, 152, 46

[56] References Cited

U.S. PATENT DOCUMENTS

| | | | |
|---|---|---|---|
| 2,585,714 | 2/1952 | Wrobel et al. | 310/90.5 |
| 3,614,181 | 10/1971 | Meeks | 310/90.5 |
| 4,563,046 | 1/1986 | Shimamoto | 310/90.5 |
| 4,668,885 | 5/1987 | Scheller | 310/90.5 |

Primary Examiner—William H. Beha, Jr.
Assistant Examiner—D. S. Rebsch
Attorney, Agent, or Firm—Emmanuel J. Lobato; Robert E. Burns

[57] ABSTRACT

A noncontact magnetic bearing has cylindrical magnetic members magnetized axially, slightly different in radius and different in length, disposed in opposite relation to each other, with their magnetic poles of reverse polarities displaced vertically relative to each other. Either the inner cylindrical magnetic member or the outer cylindrical magnetic member can be used as a shaft, and consequently, the other is fixed to a support member. The inner cylindrical magnetic member and the other cylindrical magnetic member are held at a stable and mutual-noncontact state to provide a noncontact magnetic bearing that is stable axially, as well as radially.

10 Claims, 26 Drawing Sheets

NONCONTACT BEARING UTILIZING MAGNETISM

BACKGROUND OF THE INVENTION

The present invention relates to a noncontact bearing which utilizes magnetism.

In prior art, there has not yet been proposed such a noncontact bearing which is stable in the vertical direction as well as in the horizontal direction.

SUMMARY OF THE INVENTION

It is therefore an object of the present invention to provide a magnetic noncontact bearing which is stable in the vertical direction as well as in the horizontal direction.

To attain the above object, the present invention is constituted as follows:

(1) A noncontact bearing utilizing magnetism comprising:
- a first cylindrical or rod-like magnetic member magnetized axially thereof;
- a second cylindrical magnetic member disposed outside the first magnetic member in adjacent but spaced relation thereto, magnetized in its axial direction reversed from that magnetization of the first magnetic member, and slightly different in length from the first magnetic member; and
- support means for supporting either one of the first and second magnetic members without impeding the rotation of the other about its axis;
- wherein the said one of the first and second magnetic members is used as a rotary shaft.

(2) A noncontact bearing utilizing magnetism comprising:
- a first tubular or rod-like magnetic member magnetized axially thereof;
- a second tubular magnetic member disposed outside the first magnetic member in adjacent but spaced relation thereto, magnetized in its axial direction reversed from that of magnetization of the first magnetic member, and slightly different in length from the first magnetic member; and
- support means for supporting either one of the first and second magnetic members without impeding movement of the other along its axis;
- wherein the said one of the first and second magnetic members is used as a guide shaft.

(3) A magnetic noncontact bearing utilizing magnetism comprises:
- a first cylindrical or rod-like magnetic member formed so that magnetic poles are continuously arranged on the circumference of its cross-section;
- a second cylindrical or rod-like magnetic member disposed inside or outside the first magnetic member in adjacent but closely spaced relation thereto, the second magnetic member having magnetic poles continuously arranged on the circumference of its cross-section and having a second opposite polarity magnetic pole spacing in the second magnetic member slightly different from a first opposite polarity magnetic pole spacing in the first magnetic member; and
- support means for supporting one of the first and second magnetic members without impeding the rotation of the other about its axis. The second magnetic member has canceling magnetic poles of the same spacing as the first opposite polarity magnetic pole spacing of the first magnetic member and facing the magnetic poles of the first magnetic member, for canceling the influence of magnetism induced by the magnetic poles of the first magnetic member. Further, the second magnetic member has, at positions where straight lines passing through the magnetic poles of opposite polarities in the first magnetic member cross the second magnetic member, correcting magnetic poles for preventing the influence of magnetism induced by the magnetic poles of the first magnetic member. A rotary shaft is provided at the center of the aforementioned one of the first and second magnetic members.

(4) A noncontact bearing utilizing magnetism comprising:
- a first magnetic member formed into a solid of revolution and having magnetic poles each continuously allocated on a circumference of a cross-section thereof by magnetizing longitudinally thereof;
- a second cylindrical magnetic member disposed inside or outside said first magnetic member in adjacent but slightly spaced relation to an edge of a cross-section thereof at the allocation position of the magnetic poles of the first magnetic member, and magnetized in its longitudinal direction to provide on a circumference continuous allocation of magnetic poles of different polarities from the polarities of the magnetic poles of the first magnetic member; and
- support means for supporting one of said first magnetic member and said second magnetic member without impeding the rotation of the other about its axis;
- where the first magnetic member and the second magnetic member are formed so that the magnetic poles of different polarities disposed on the first magnetic member and the second magnetic member respectively are close to each other, and so that magnetic members each disposed at respective intermediate positions between two magnetic poles at each of the first magnetic member and the second magnetic member are separated by a relatively wide air gap therebetween.

BRIEF DESCRIPTION OF THE DRAWINGS

The present invention will be described in detail below with reference to the accompanying drawings, in which:

FIG. 21 is a graph showing the horizontal restoring force in the present invention;

DETAILED DESCRIPTION

Figure 1A:
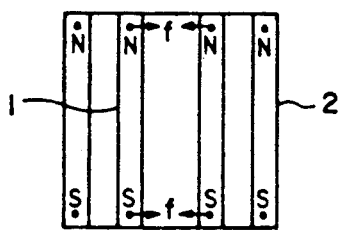
FIG. 1A and 1B are sectional views showing an example of the construction of a conventional noncontact bearing.
Figure 1B:
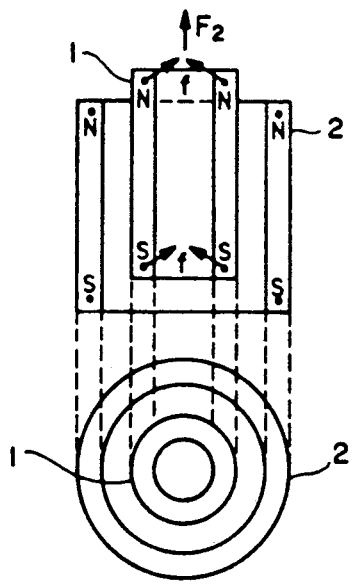

For a noncontact bearing of the type utilizing magnetism it is very likely, in general, to think of such a structure as shown in FIG. 1A in which inner and outer cylindrical members 1 and 2 are held out of contact with each other by virtue of repulsion between magnetic poles of the same kind formed thereon in opposing relation. With such a structure, the cylindrical members 1 and 2 remain out of contact when their magnetic poles face each other accurately without vertical displacement relative to each other, but this state is unstable and once they are displaced even slightly in the vertical direction, a force $F_2$ acts in the Z direction, pulling up or down the inner cylindrical member 1 out of the outer one as depicted in FIG. 1B. Accordingly, a need exists for the noncontact bearing of this kind to be stable in the Z direction as well as in the horizontal direction.

Next, the principle of the present invention to attain the above object will be described.

According to the present invention, cylindrical magnetic members magnetized axially thereof, slightly different in radius and different in length are disposed in opposite relation to each other with their magnetic poles of reverse polarities displaced vertically relative to each other, and either one of the inner and outer cylindrical magnetic members can be used as a shaft or bearing, and consequently, the other is fixed to a support member. It appears, in this case, that the magnetic pole of the inner cylindrical member is attracted by the magnetic pole of the outer cylindrical member by which one end of the one cylindrical member sticks to one end of the other, but this does not occur in practice; it has been found experimentally by the inventor of the present application that the inner and outer cylindrical members remain out of contact with each other. On the other hand, it has been ascertained theoretically that both cylindrical members stick to each other when their magnetic poles are accurately opposite without vertical displacement relative to each other.

Now, the principle on which the inner and outer cylindrical members are held out of contact with each other by magnetizing them with magnetic poles of opposite polarities in opposing relation will be described using a two-dimensional model which corresponds to the longitudinal sectional view of a typical example of the above-mentioned structure.

Figure 2A:
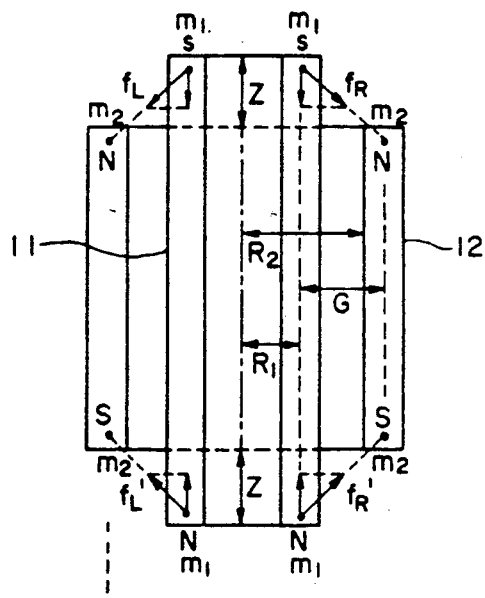
FIGS. 2A, 2B and 2C are sectional views explanatory of an embodiment of the present invention.

FIG. 2A shows in section a model in which magnetic poles of intensities $m_1$ and $m_2$ on inner and outer cylindrical members 11 and 12 are displaced by Z in the vertical direction. Let forces between the right-hand magnetic poles be represented by $f_R$ and $f_R'$ and forces between the left-hand magnetic poles be represented by $f_L$, $f_L'$, respectively. When the two cylindrical members are coaxial, the right- and left-hand forces are equal to each other as follows:

$$f_R = f_L, \ f_R' = f_L',$$

Figure 2B:
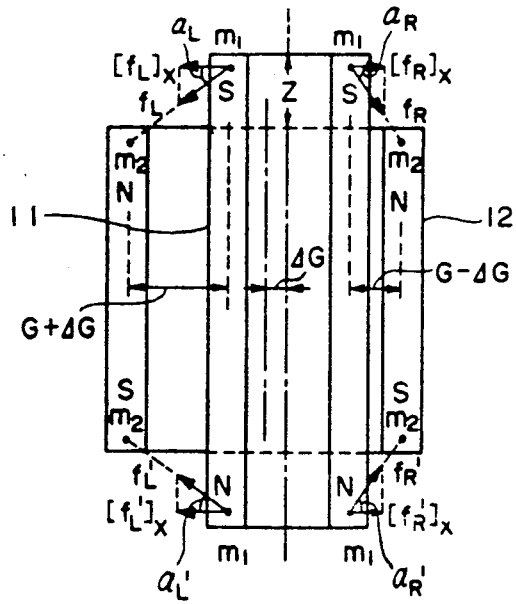

When the inner cylindrical member 11 moves to right by $\Delta G$ as shown in FIG. 2B, the right- and left-hand forces become as follows:

$$f_R > f_L, \ f_R' > f_L',$$

It is considered that if this state continues, the inner cylindrical member will move to right more and more because the rightward forces are large. Their component forces $[f_R]_x$, $[f_L]_x$ and $[f_R']_x$, $[f_L']_x$ in the x direction are given by following expressions:

$$[f_R]_x = f_R \cos\alpha_R, \ [f_L]_x = f_R \cos\alpha_L$$

$$[f_R']_x = f_R' \cos\alpha'_R, \ [f_L']_x = f_L' \cos\alpha'_L$$

The relationship of magnitude between the component forces $[f_R]_x$ and $[f_L]_x$ depends on angles $\alpha_R$ and $\alpha_L$. As will be referred to later on, when the displacement $\Delta G$ is small, the component force $[f_R]_x$ is large and the inner cylindrical member is moved to right, but when the displacement $\Delta G$ exceeds a certain value related to the distance Z, $\cos\alpha_L$ becomes greater than $\cos\alpha_R$ and hence the component force $[f_L]_x$ becomes large, so that the direction attraction of the inner cylindrical member is reversed and the cylindrical member stands still at the position where $[f_L]_x = [f_R]_x$. This is a stable point. FIG. 2B shows a state in which the inner cylindrical member has moved past this point, the component force $[f_L]_x$ is greater than that $f_R]_x$ and the inner cylindrical member is being subjected to a force which pulls it back to the center.

In the case where the outer cylindrical member 12 is fixed, the force acting on the inner cylindrical member 11 is downward between the upper magnetic poles and upward between the lower magnetic poles, and the inner cylindrical member 11 lies at the position where these forces are balanced.

Figure 2C:
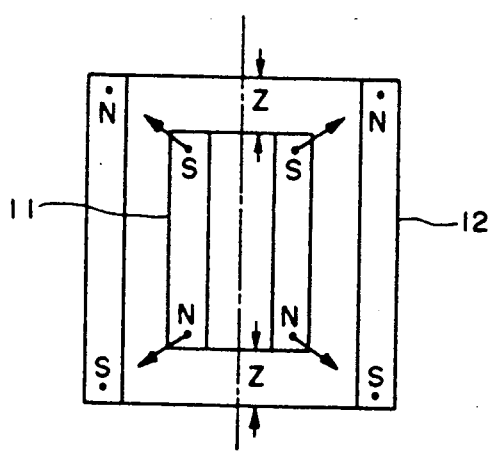

In FIGS. 2A and 2B the inner cylindrical member 11 is shown to be longer than the outer one 12 by 2Z, but even if the inner cylindrical member 11 is shorter than the outer one 12 by 2Z as depicted in FIG. 2C, the former can similarly be held at the position where it stably remains out of contact with the latter.

Incidentally, the above-mentioned stable state can be retained theoretically as long as the difference 2Z in length between the inner and outer cylindrical members 11 and 12 is greater than zero. In practice, however, gravity acts on a shaft in a floating state and the floating shaft is subjected to a driving force for rotating or slidably guiding it axially thereof by a motor or electromagnet. Hence the difference 2Z needs only to be set to a value with a proper margin so that the above-mentioned stable state can be maintained even in the presence of such an external force. In this instance, it is preferable to select the difference 2Z as small as possible, because the force interacting between the magnetic poles is small when the difference is too large.

The present invention is directed to the bearing itself and when the bearing is used, a motor, electromagnet or similar drive unit is separately provided for rotating or slidably guiding the floating shaft axially thereof. Accordingly, this drive unit is not shown in each embodiment of the invention.

The structure of the present invention has its feature in that the stable point lies at the position where the both cylindrical members are out of contact with each other as described above. For further clarification of this point an analysis will be made using the two-dimensional models depicted in FIGS. 2A, 2B and 2C. Since the force between the upper magnetic poles is equal to the force between the lower magnetic poles in FIG. 2B, only the former will be discussed. The forces $f_R$ and $f_L$ between the right upper magnetic poles (S, N) and between the left upper magnetic poles (S, N), the north and south magnetic poles being of intensities $m_1$ and $m_2$, respectively, are expressed as follows:

$$f_R = \frac{m_1 m_2}{D_R^2}, f_L = \frac{m_1 m_2}{D_L^2}$$

where $D_R$ and $D_L$ are the distances between the right- and left-hand magnetic poles and are expressed as follows:

$$D_R^2 = (G - \Delta G)^2 + Z^2$$

$$D_L^2 = (G + \Delta G)^2 + Z^2$$

The x components of the forces $f_R$ and $f_L$ are obtained by multiplying the above distances by $\cos \alpha_R$ and $\cos \alpha_L$, respectively, where $\alpha_R$ and $\alpha_L$ are angles between the forces and the x axis, respectively. Letting the x components of the forces $f_R$ and $f_L$ be represented by $[f_R]_x$ and $[f_L]_x$, they are given by $$[f_R]_x = \frac{m_1 m_2 \cos \alpha_R}{D_R^2}$$

$$[f_L]_x = \frac{m_1 m_2 \cos \alpha_L}{D_L^2}$$

where $$\cos \alpha_R = \frac{G - \Delta G}{D_R}, \cos \alpha_L = \frac{G + \Delta G}{D_L}$$

Therefore, $[f_R]_x$ and $[f_L]_x$ become as follows:

$$[f_R]_x = \frac{m_1 m_2 (G - \Delta G)}{[(G - \Delta G)^2 + Z^2]^{3/2}}$$

$$[f_L]_x = \frac{m_1 m_2 (G + \Delta G)}{[(G + \Delta G)^2 + Z^2]^{3/2}}$$

Since $[f_R]_x$ and $[f_L]_x$ are rightward and leftward forces, respectively, the resultant force $F_x$ of the two rightward forces is as follows:

$$F_x = [f_R]_x - [f_L]_x = \frac{m_1 m_2 (G - \Delta G)}{[(G - \Delta G)^2 + Z^2]^{3/2}} - \frac{m_1 m_2 (G + \Delta G)}{[(G + \Delta G)^2 + Z^2]^{3/2}}$$

By checking out this expression it is possible to know how the forces are applied to the inner cylindrical member when changed. The resultant force $F_x$, if represented by $\Delta G/G$ and $Z/G$, becomes as follows:

$$F_x = \frac{m_1 m_2 \left(1 - \frac{\Delta G}{G}\right)}{G^2 \left[\left(1 - \frac{\Delta G}{G}\right)^2 + \frac{Z^2}{G^2}\right]^{3/2}} - \frac{m_1 m_2 \left(1 + \frac{\Delta G}{G}\right)}{G^2 \left[\left(1 + \frac{\Delta G}{G}\right)^2 + \frac{Z^2}{G^2}\right]^{3/2}}$$

Figure 3:
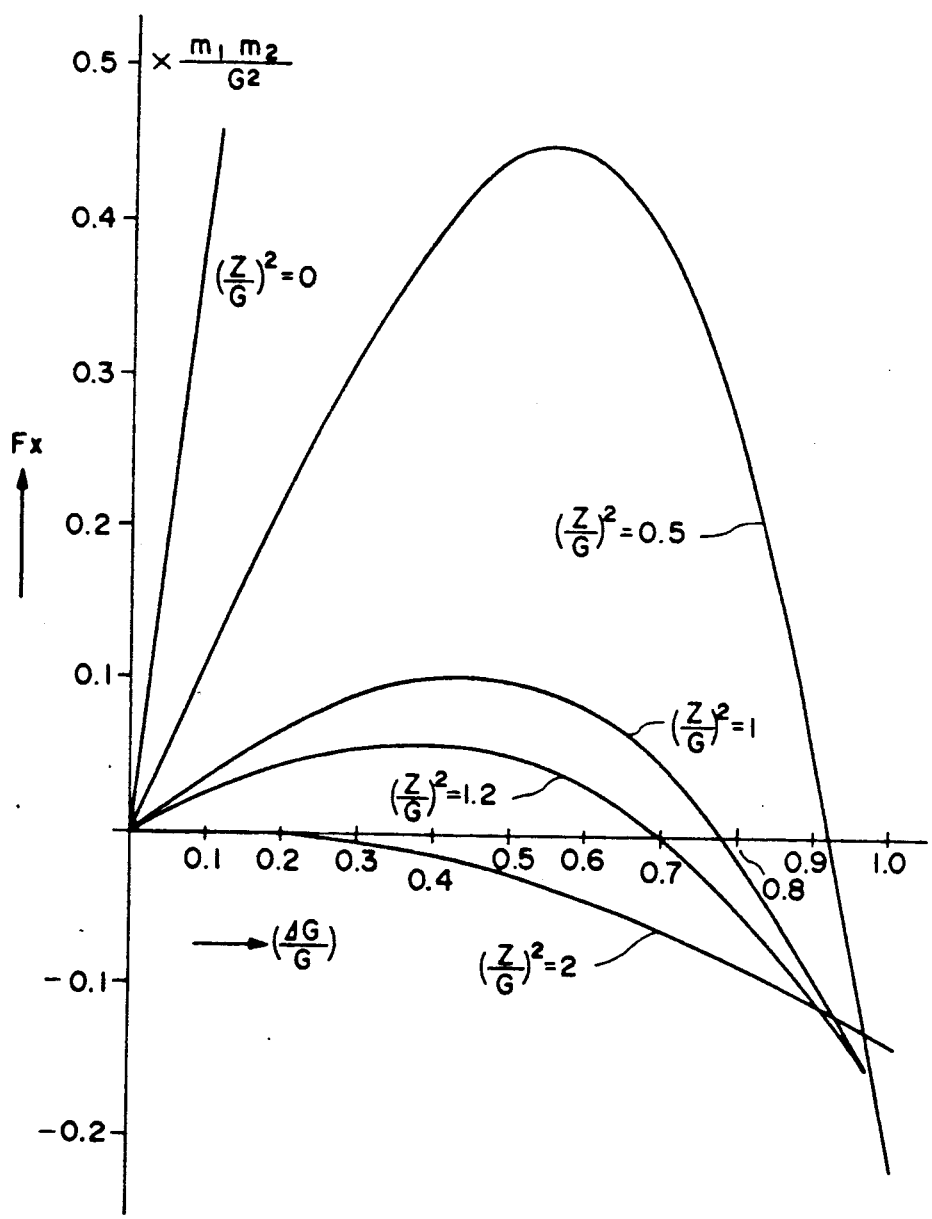
FIG. 3 is a characteristic diagram for explaining the principle of the invention by use of a two-dimensional model.

FIG. 3 shows the resultant force $F_x$ against $\Delta G/G$, using $(Z/G)^2$ as a parameter.

It is seen from FIG. 3 that when $(Z/G)^2 = 1$, the inner cylindrical member is subjected to a force in the direction in which it was shifted, that is, the rightward force over a range of $\Delta G/G$ from 0 to 0.77, but that when $\Delta G/G = 0.77$, $F_x = 0$, that is, an equilibrium point is reached and that when the inner cylindrical member is shifted further to right, it is subjected to a leftward force over a range of $\Delta G/G$ from 0.77 to 1. In other words, when the inner cylindrical member shifted to right or left from the position where $\Delta G/G = 0$, a force in that direction is applied to the inner cylindrical member, accelerating its movement. Accordingly, the position where $\Delta G/G = 0$ is an unstable point. However, as the position where $\Delta G/G = 0.77$ is approached, the force decreases and becomes zero at the position where $\Delta G/G = 0.77$, and even if the inner cylindrical member tends to right, it is subjected to a leftward force, and hence comes to a standstill at the position where $\Delta G/G = 0.77$. Thus, the position where $\Delta G/G = 0.77$ is a stable point when $(Z/G)^2 = 1$. It is seen from FIG. 3 that the inner cylindrical member thus stops at the position where $\Delta G/G = 0.77$ and remains out of contact with the outer cylindrical member. Likewise, it is seen that when $(Z/G)^2 = 0.5$ and $(Z/G)^2 = 1.2$, positions where $\Delta G/G = 0.92$ and $\Delta G/G = 0.69$ are stable points where the inner cylindrical member stays out of contact with the outer cylindrical member. It is seen that when $(Z/G)^2 = 2$, a position where $(\Delta G/G) = 0$ is a stable point, not an unstable point. It is very important that the inner cylindrical member has its stable point at the position where $(\Delta G/G) = 0$, and since a force toward the center axis always acts on the inner cylindrical member, a restoring force is applied thereto, even if the inner cylindrical member is displaced from the center axis by some cause.

As will be appreciated from the above analysis of the two-dimensional model, the bearing of the present invention has a noncontact function. To confirm the noncontact function, the inventor has made an analysis using a three-dimensional model close to the actual structure.

Figure 4:
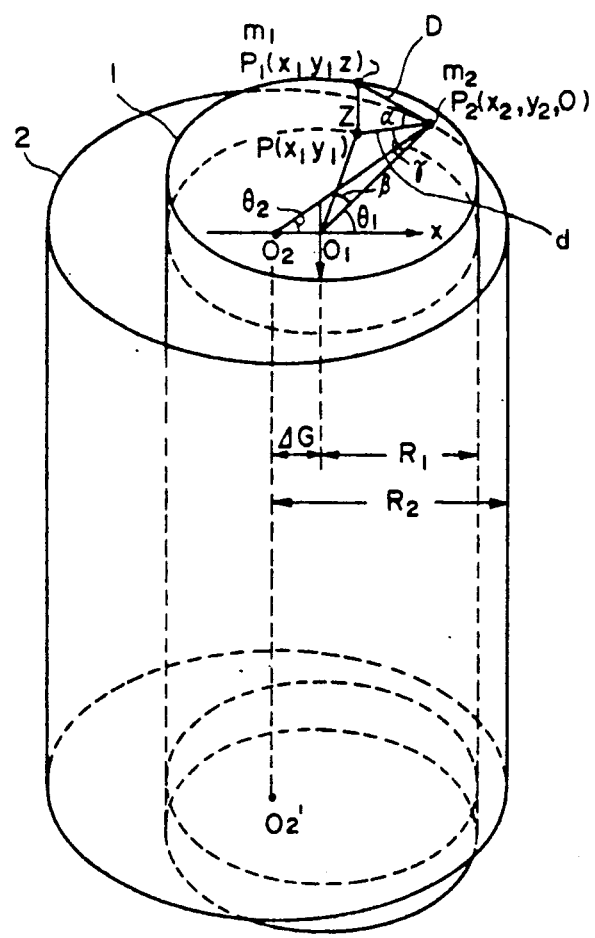
FIGS. 4 and 5 are a perspective view and a characteristic diagram explanatory of the principle of the present invention by the use of a three-dimensional model.

Now, consider that magnetic poles of intensities $m_1$ and $m_2$ are present at points $P_1(x_1, y_1, z)$ and $P_2(x_2, y_2, 0$ in FIG. 4. Since the distance D between the both points is given by $$D^2 = d^2 + Z^2$$

where $d^2 = (x_2 - x_1)^2 + (y_2 - y_1)^2$, a force f acting on the points $P_1$ and $P_2$ is given by $$f = \frac{m_1 m_2}{D^2}$$

and the resultant force of the force f in the x, y plane is represented by $f\cos\alpha$. Further, the resultant force to the radius of an inner circle is represented by $f\cos\alpha\cos\gamma$. By moving on the inner circle a projected point P of the $P_1$ on the x, y plane and integrating it with respect to $\beta$, the entire force of the magnetic pole on the inner circle, which acts on the point $P_2$, is obtained. Then, by moving the point $P_2$ on the outer circle and integrating it with respect to $\theta_2$, the entire force of the magnetic poles on the inner and outer circles is obtained. The x component of this force can be obtained by multiplying it by $\cos\theta_1$. Letting the x component be represented by $F_x(\theta_2, \beta)$, it follows the $$F_x(\theta_2, \beta) = \int_0^{2\pi} \int_0^{2\pi} \frac{m_1 m_2 \cos\alpha \cos\gamma \cos\theta_1}{D^2} d\beta d\theta_2$$

By transforming $\theta_1$ into a function of $\theta_2$ and $\beta$, the following expression is obtained.

$$F_x(\theta_2, \beta) = 4m_1 m_2 \int_0^\pi \int_0^\pi \frac{(R_2 \cos\theta_2 - \Delta G)[1 - R_1(x_2^2 + y_2^2)^{-1/2}]}{[x_2^2 + y_2^2 + R_1^2 + Z^2 - 2R_1(x_2^2 + y_2^2)^{1/2} \cos\beta]^{3/2}} d\beta d\theta_2$$

where $\cos\alpha = \frac{d}{D}$, $$\cos\gamma = \frac{(x_2^2 + y_2^2)^{1/2} - R_1 \cos\beta}{d}$$

$$\cos\theta_1 = \frac{R_2 \cos\theta_2 - \Delta G}{(x_2^2 + y_2^2)^{1/2}}$$

$$x_2^2 + y_2^2 = R_2^2 + \Delta G(\Delta G - 2R_2 \cos\theta_2)$$

Figure 5:
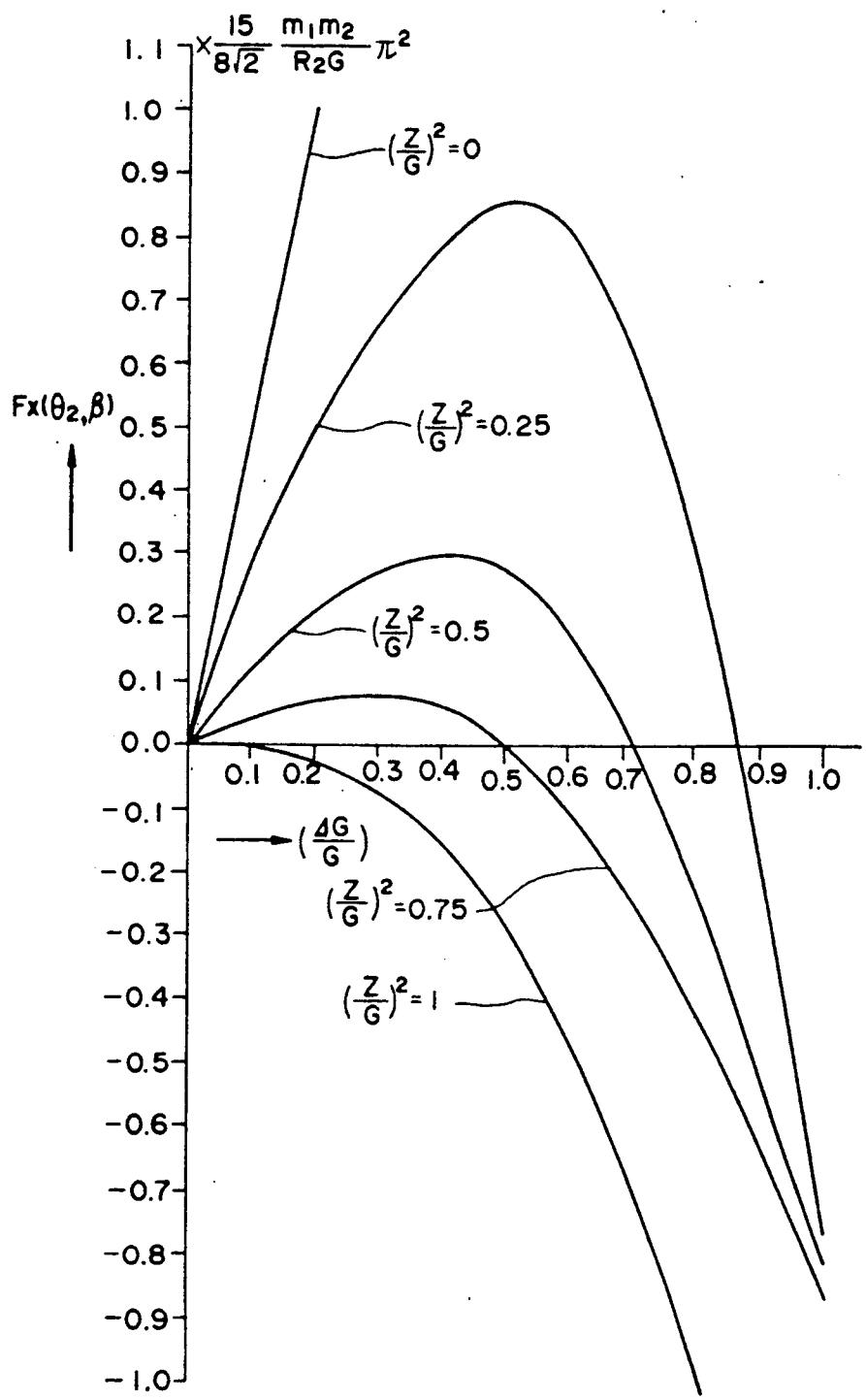

FIG. 5 shows $F_x(\theta_2, \beta)$ against $\Delta G/G$, using $(Z/G)^2$ as a parameter. Here, $R_1$ and $R_2$ are radii of the inner and outer cylindrical members, respectively, and G is the difference between the radii $R_2$ and $R_1$ and is expressed by $G = R_2 - R_1$. A notation $\Delta G$ is a deviation of the inner cylindrical member in the x direction, and Z is the length of the magnetic pole of each of the inner and outer cylindrical members in the vertical direction.

The curves shown in FIG. 5 indicate about the same tendencies as those of the curves obtained with the afore-mentioned two-dimensional model but somewhat differ in the value of $(Z/G)^2$. Accordingly, the basic tendency of an actual example can be known even if the two-dimensional model is used. It is considered, however, that the three-dimensional model shows characteristics close to actual ones.

It is seen from FIG. 5 that the curves $(Z/G)^2 = 0.25$, $(Z/G)^2 = 0.5$, $(Z/G)^2 = 0.75$ and $(Z/G)^2 = 1$ have stable points at $\Delta G/G = 0.87$, $\Delta G/G = 0.72$, $\Delta G/G = 0.5$ and $\Delta G/G = 0$, respectively, and provide the noncontact characteristic. The curve $(Z/G)^2 = 0$ shows a case where the magnetic poles of the inner and outer cylindrical members accurately face each other without any relative displacement in the vertical direction. In this instance, the force increases with an increase in $(\Delta G/G)$, that is, there is no stable point, and consequently, when $(\Delta G/G)$ approaches 1, the force becomes infinitely great, bringing the both magnetic poles into contact with each other. The curve $(Z/G)^2 = 1$ indicates that it has a stable point at $\Delta G/G = 0$ where the both cylindrical members are coaxial.

Figure 6:
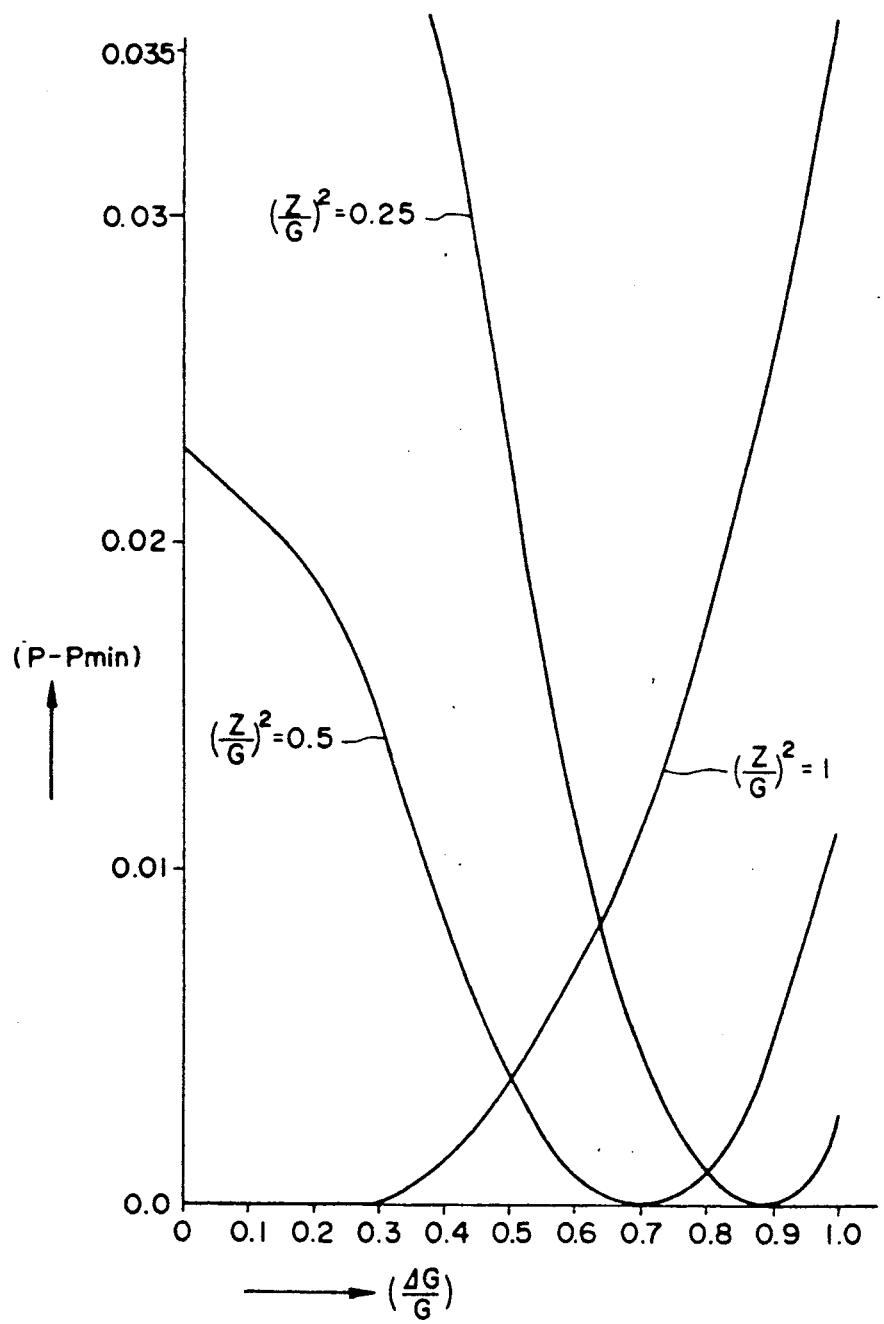
FIGS. 6 and 7 are graphs showing potentials in a plane perpendicular to the axis of the noncontact bearing of the present invention and in a direction along the axis, respectively.

FIG. 6 shows the results of calculation of a potential P.

It is seen from FIGS. 5 and 6 that the point $F_x(\theta_2, \beta) = 0$ corresponds to the point of zero potential. Further, the property of each stable point can be understood intuitively from FIG. 6.

The above description has been given of the noncontact characteristic of the bearing of the present invention, and the following description will be given of a force in the Z direction and its stability. Letting component forces in the Z direction of the forces $f_R$, $f_L$, $f_R'$ and $f_L'$ acting on the inner cylindrical member in FIG. 2 be represented by $[f_R]_z$, $[f_L]_z$, $[f_R']_z$ and $[f_L']_z$, respectively, and assuming, for the sake of brevity, that the inner and outer cylindrical members are coaxial, then $[f_R]_z = [f_L]_z$ and $[f_R']_z = [f_L']_z$. The force in the Z direction is the composition of the four forces, and consequently, letting the resultant force be represented by $F_z$, $$F_z = 2[f_R]_z - 2[f_R']_z$$

Figure 7:
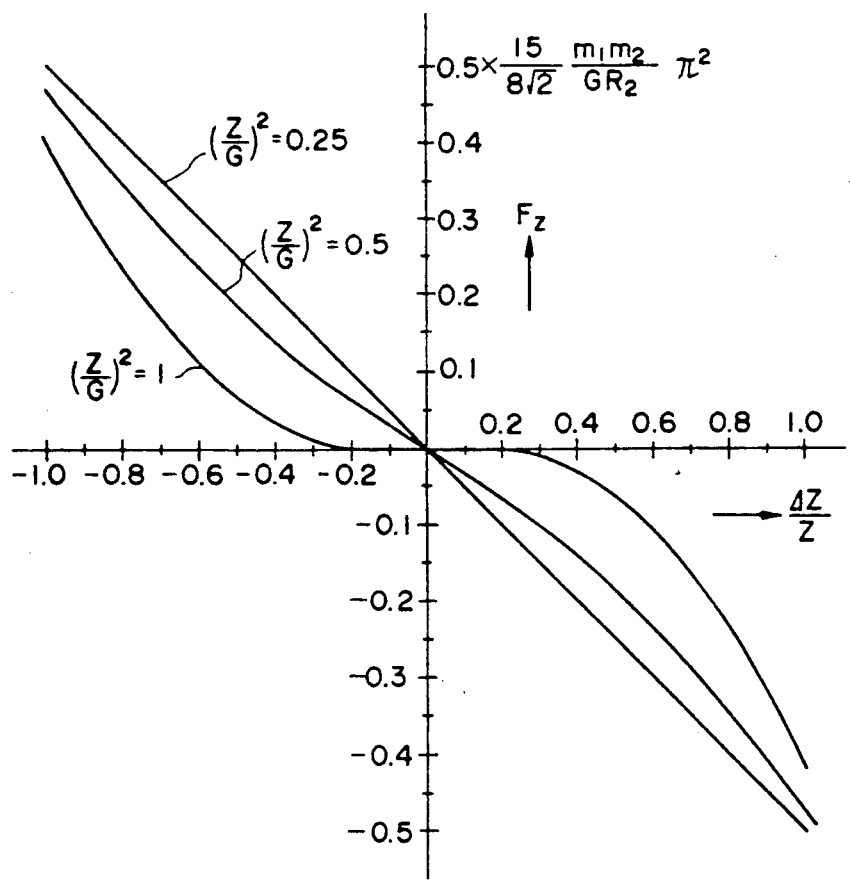

FIG. 7 shows the results of calculation of this force, using the three-dimensional model. In FIG. 7 there is shown against $\Delta Z/Z$ the force $F_z$ in the case where the relative displacement of the inner and outer cylindrical members in the direction of height of their magnetic poles is represented by Z as shown in FIG. 2A and the inner and outer cylindrical members are moved by $\Delta Z$ in the Z direction.

From FIG. 7 it is seen that when $\Delta Z/Z$ is shifted in the negative direction, the force $F_z$ is applied in the positive direction to exert a restoring force by which the cylindrical members tend to return to their original positions and that when $\Delta Z/Z$ is shifted in the positive direction, the force $F_z$ is applied in the negative direction to exert a restoring force by which the cylindrical members tend to return to their original positions. Where no external force is present in the vertical direction as mentioned above, the inner cylindrical member stably stands still at the position $(\Delta Z/Z) = 0$ while floating at the center position in the vertical direction. When an external force such as gravity is applied from above, a force corresponding to the external force is generated in the opposite direction and the inner cylindrical member comes to a standstill when the both forces becomes equal.

Figure 8:
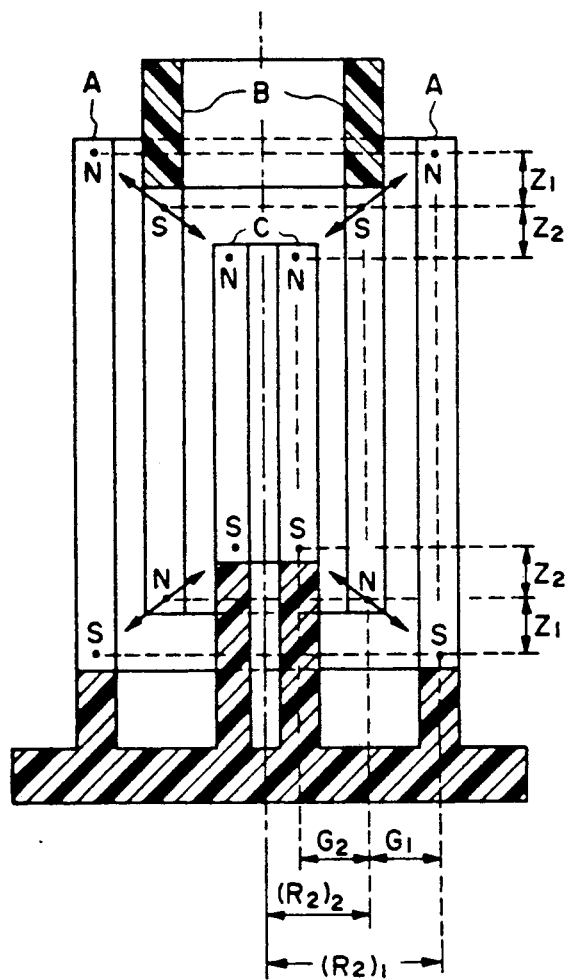
FIGS. 8 and 9 are sectional views illustrating embodiments of the present invention which employ three magnetic members.
Figure 9:
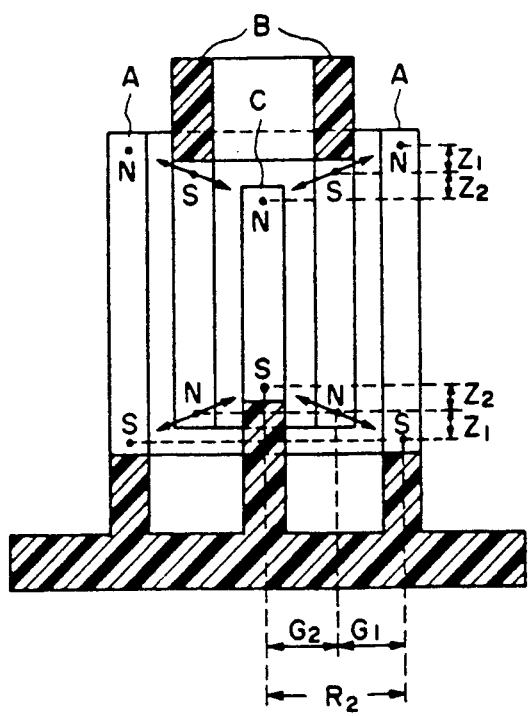

With an increase in the restoring force toward the center in the case where the inner and outer cylindrical members are shifted in the x or Z direction from the center, the stability improves accordingly. FIGS. 8 and 9 illustrate embodiments of structures excellent in restoring force. Although the afore-mentioned embodiment employs two cylindrical magnetic members, the embodiment of FIG. 8 has a structure in which three cylindrical magnetic members A, B and C are used, the upper end portions of the outermost and innermost cylindrical members A and C are magnetized with magnetic poles different from that of the intermediate cylindrical member B while the magnetic poles of the cylindrical members A and B and the magnetic poles of the cylindrical members B and C are staggered vertically by $Z_1$ and $Z_2$ relative to each other. The magnetic poles at the lower ends of the three cylindrical members A, B and C are disposed symmetrically with respect to the center thereof as shown, and the cylindrical members A and C are coupled together at their lower ends to form a bearing, whereas the cylindrical member B is disposed between them and is used as a movable shaft. It is also possible, of course, to use the cylindrical member B as a bearing and the cylindrical members A and C as a movable shaft. With such a structure as shown in FIG. 8, the magnetic poles of the cylindrical member B are pulled diagonally upward and downward by the magnetic poles of the cylindrical members A and B, respectively, that is, the cylindrical member B is held as if it is suspended.

Figure 10:
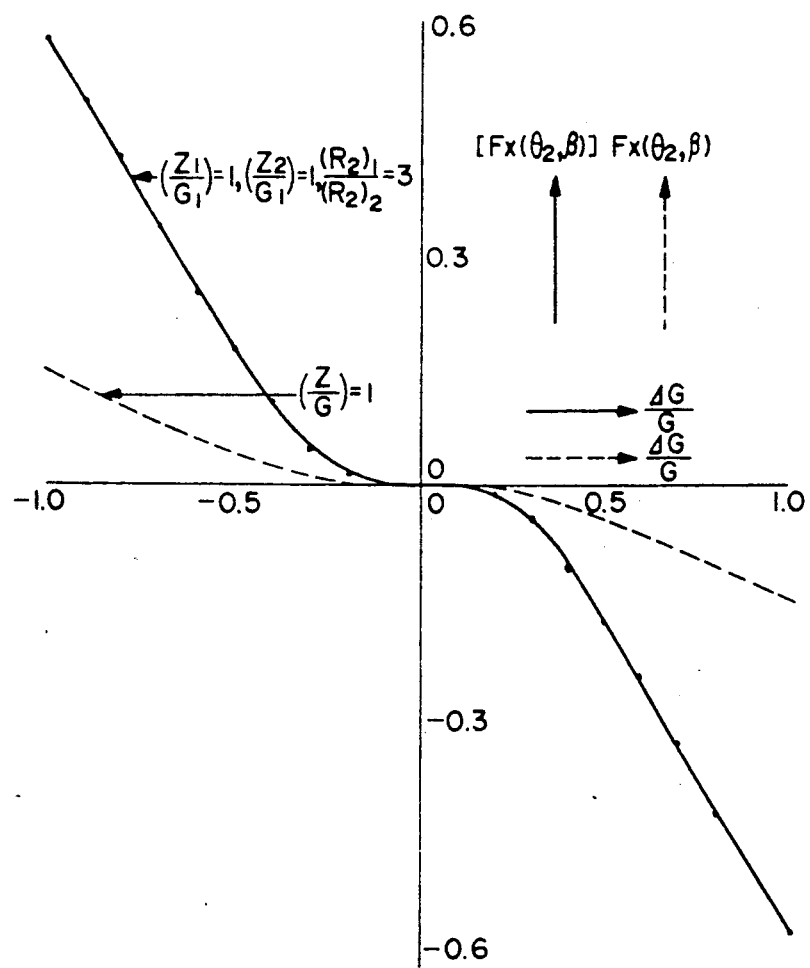
FIGS. 10, 11 and 12 are graphs showing restoring force and potential characteristics of the embodiment depicted in FIG. 8.
Figure 11:
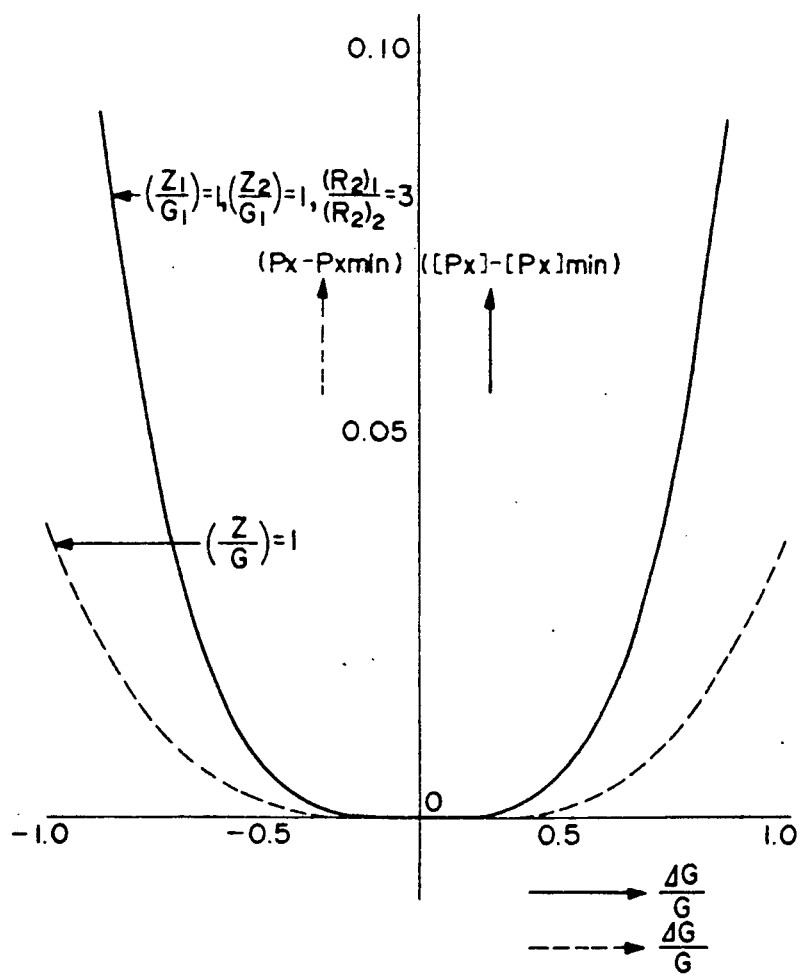

FIG. 10 shows, in terms of $[F_x(\theta_2, \beta)]$ in the embodiment of FIG. 8, the force which is applied in the x direction when the cylindrical member B is shifted by $\Delta x$ relative to the cylindrical member A in the x direction. In this case, the curve of $[F_x(\theta_2, \beta)]$ is shown with parameters $(Z_1/G_1)=1$, $(Z_2/G_1)=1$ and $(R_2)_1/(R_2)_2=3$. The curve of the force $F_x(\theta_2, \beta)$ with $(Z/G)^2=1$ in the embodiment depicted in FIGS. 2A, 2B and 2C is shown by the broken line for comparison. It is seen from FIG. 10 that the restoring force which acts in the $-x$ direction when the cylindrical member B is shifted by $\Delta x$ in the x direction is far greater than in the foregoing embodiment. FIG. 11 shows the potential $-([Px]-[Px]_{min})$ in this instance, obtained with the parameters $(Z_1/G_1)=1$, $(Z_2/G_1)=1$ and $(R_2)/(R_2)_2=3$, and its comparison with the broken-lined curve of the potential $(P_x-P_{xmin})$ in the afore-mentioned embodiment explicitly indicates that the restoring force in this embodiment is far greater than in the foregoing embodiment.

The embodiment shown in FIG. 9 is simple-structured in that the innermost magnetic member is a rod, and the characteristic of this embodiment is substantially the same as that obtainable with the FIG. 8 embodiment.

Figure 12:
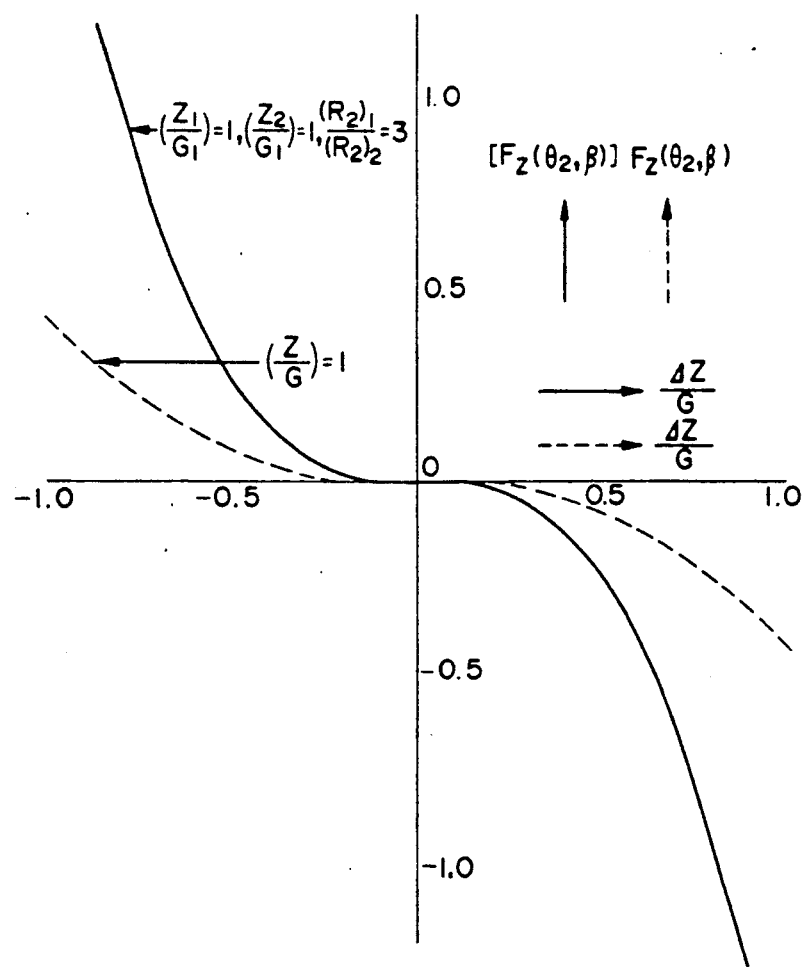
Figure 13A:
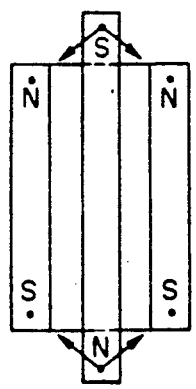
FIGS. 13A, 13B, 14A, 14B, 15, 16A, 16B, 17A, 17B and 18 are sectional and side views illustrating modified forms of the present invention.
Figure 13B:
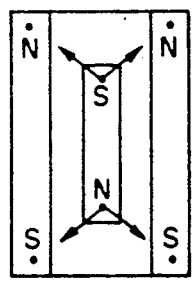
Figure 14A:
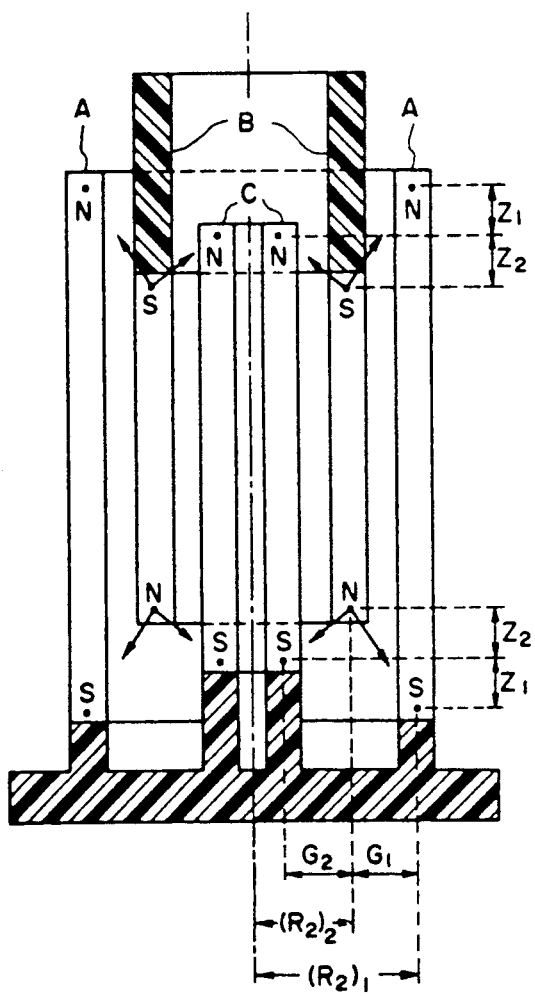
Figure 14B:
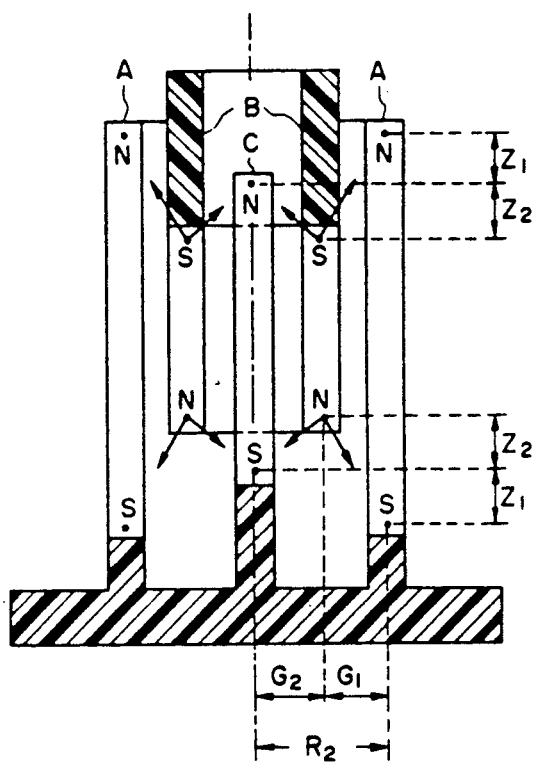

The restoring force in the Z-axis direction in the FIG. 8 embodiment is shown in FIG. 12, in which a curve with $(Z/G)=1$ in the embodiment depicted in FIGS. 2A, 2B and 2C is shown in the broken line for comparison. As will be seen from FIG. 12, the embodiment of FIG. 8 is more excellent than the embodiment of FIG. 2 in the restoring force in the Z direction as well. FIGS. 13A and 13B illustrate another embodiment of the invention in which the inner cylindrical member in the embodiment depicted in FIGS. 2A and 2C is replaced by a rod-like magnetic member. FIGS. 14A and 14B illustrate other embodiments in which the height of the cylindrical member B in FIGS. 8 and 9 is smaller than the heights of the cylindrical members A and C. The heights of the cylindrical members may also be set in an increasing order C-B-A. These embodiments exhibit the characteristics shown in FIGS. 10, 11 and 12.

Figure 15:
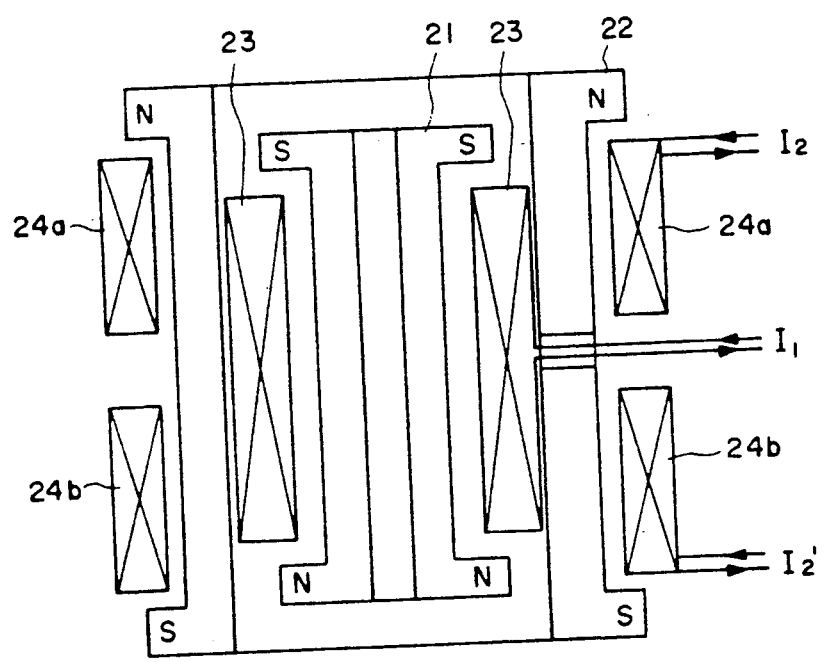

While in all of the foregoing embodiments the magnetic member forming the bearing is magnetized as a permanent magnet, an electromagnet may also be used in place of the permanent magnet. FIG. 15 illustrates an example, in which a floating inner cylindrical member 21 is magnetized to form magnetic poles N and S, as shown, by applying a DC current $I_1$ to a coil 23 fixedly mounted on the inner wall of an outer cylindrical member 22, which is, in turn, magnetized to form magnetic poles N and S, as shown, by applying DC currents $I_2$ and $I_2'$ to coils 24a and 24b, respectively. Other operations of this embodiment are identical with those described above.

Figure 16A:
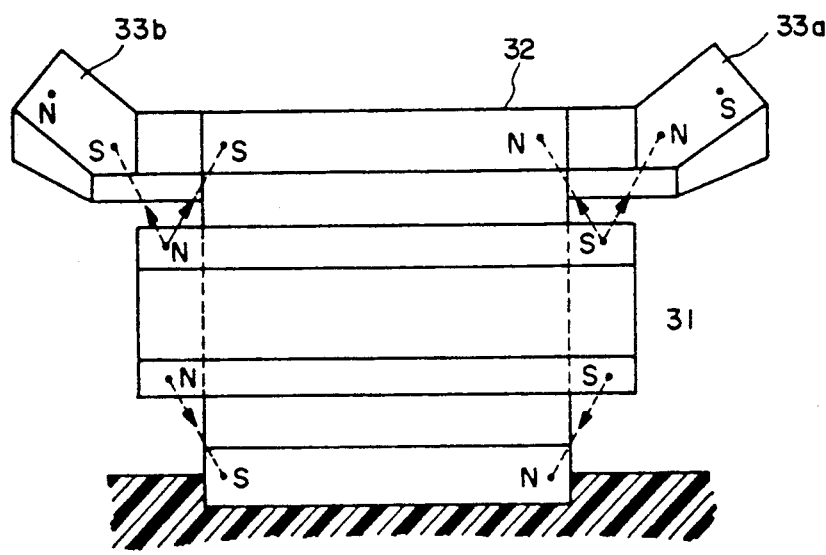
Figure 16B:
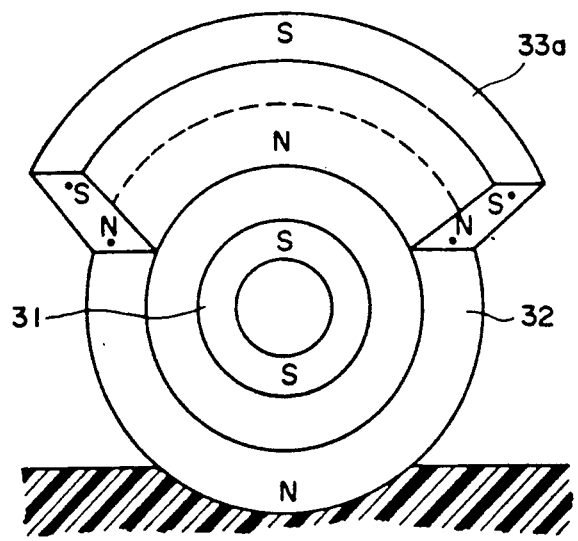

In each of the embodiments described above, when the axis of the inner cylindrical or rod-like magnetic member serving as a floating shaft is vertical, no problem will occur, but when the magnetic member is disposed horizontally, there is the possibility that owing to the gravity applied on the magnetic member serving as the floating shaft, its axis deviates from the center axis of the outer cylindrical magnetic member toward its lower inner wall, and driving of the floating shaft in such a state is not preferable from the viewpoint of the stable operation of the noncontact bearing. A solution to this problem is shown in FIGS. 16A and 16B, in which auxiliary magnets 33a and 33b are mounted on the outer cylindrical member 32 at both ends. With this structure, the above-said downward deviation of the inner cylindrical magnetic member 31 by gravity can be compensated for by the magnetic forces acting between the auxiliary magnets 22a, 33b and the magnetic poles S, N of the inner cylindrical magnetic member 31.

Figure 17A:
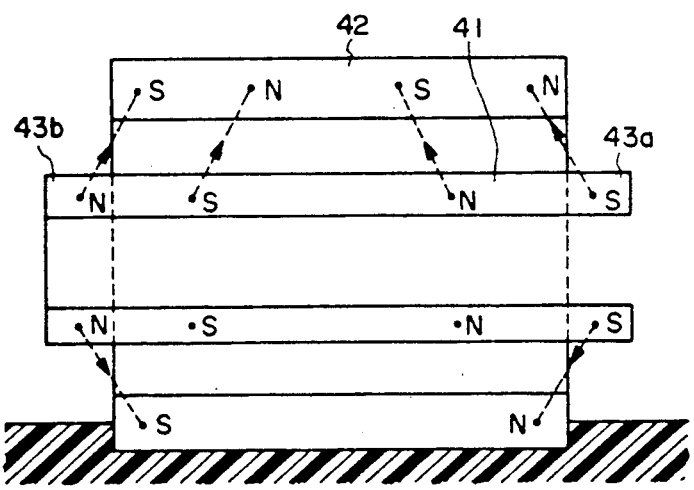
Figure 17B:
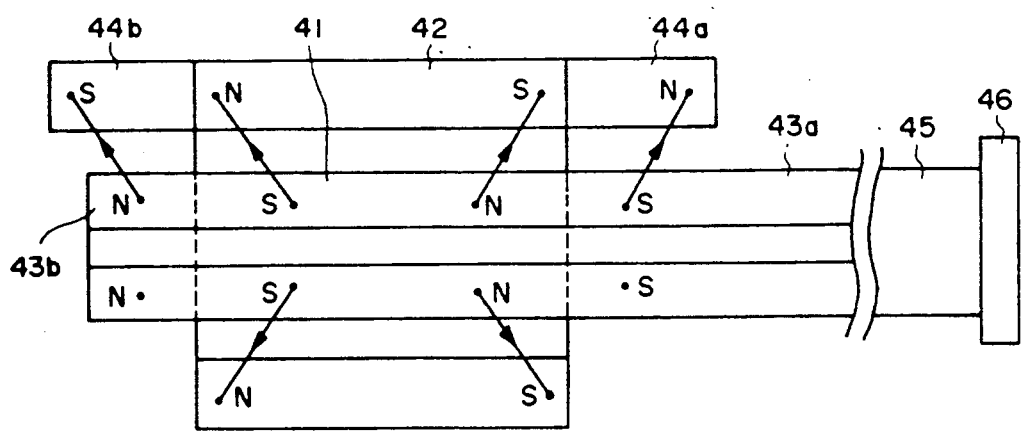

To compensate for the deviation of an inner cylindrical magnetic member 41 by gravity, it is also possible to mount auxiliary magnets 43a and 43b on the inner cylindrical magnetic member 41 as shown in FIG. 17A or mount auxiliary magnets 43a, 43b and 44a, 44b on the inner and outer cylindrical magnetic members 41 and 42 at both ends thereof, respectively, as shown in FIG. 17B. Reference numeral 45 indicates a driving shaft which is coupled to the inner cylindrical magnetic member, which is subjected to either one or both of rotation and axial movement by a driving unit 46 which includes at least one of a known motor and an electromagnet.

Figure 18:
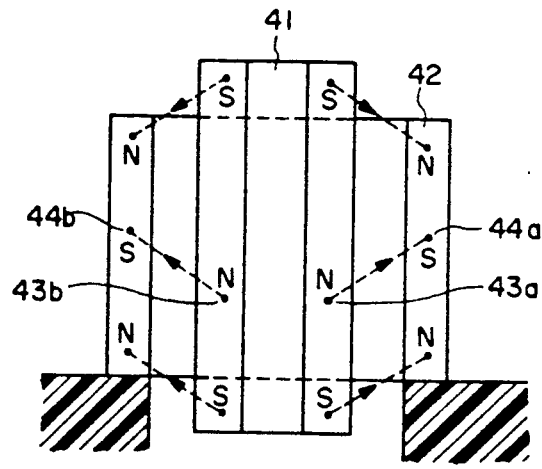

The additional provision of such auxiliary magnets is not limited specifically to the horizontal structure but may also be applied to the vertical structure by providing the auxiliary magnets 43a, 43b and 44a, 44b as shown in FIG. 18.

The number of magnetic poles in each of the magnetic members 41 and 42 need not always be four in FIG. 17A and three in FIG. 18 but may be increased as required.

The noncontact bearing proposed mentioned above is provided with a first cylindrical or rod-like magnetic member magnetized axially thereof, a second cylindrical magnetic member disposed outside the first magnetic member in adjacent but closely spaced relation thereto, magnetized in its axial direction reversed from the direction of magnetization of the first magnetic member and slightly different therefrom in length, and support means for supporting one of the first and second magnetic member without impeding the rotation of the other about its axis, the said one of the first and second magnetic members being used as a rotary shaft. In embodiments set forth in the above the restoring force in the horizontal direction tends to decrease owing to attractive forces between magnetic poles of the magnetic members and between magnetic poles induced in the magnetic members facing each other (When a magnetic pole is brought close to a magnetic member, magnetic charges of a polarity different from that of the magnetic pole are produced in the magnetic member. This phenomenon is called an "induced magnetic phenomenon" and the resulting magnetic pole will hereinafter be referred to as an "induced magnetic pole".) and the parent magnetic poles.

According to the present invention, the noncontact bearing has, at the position where the induced magnetic pole is produced, a counteracting magnetic pole opposite in polarity therefrom for counteracting the induced magnetic pole, and includes a correcting magnetic pole for eliminating bad influence of the counteracting magnetic pole. Thus, the non-contact bearing of the present invention obviates the short-comings of the bearing proposed above. Next, a description will be given of improvements by the present invention.

Figure 19A:
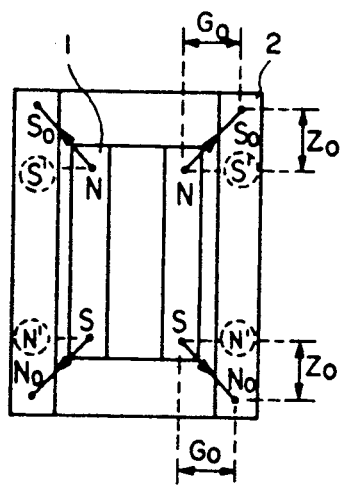
FIGS. 19A and 19B are sectional views showing an example of the construction of an above-said noncontact bearing.

FIG. 19A is a sectional view of an embodiment of the bearing proposed above. In FIG. 19A, attractive forces between magnetic poles N of the inner cylindrical member 1 and magnetic poles $S_0$ of the outer cylindrical member 2 and between magnetic poles S of the inner cylindrical member 1 and magnetic poles $N_0$ of the outer cylindrical member 2 create restoring forces acting in the horizontal direction (the distance between the magnetic poles in the horizontal direction being indicated by $G_0$) and in the vertical direction (the distance between the magnetic poles in the vertical direction being indicated by $Z_0$), providing a non-contact function. In this instance, magnetic poles S' and N' are induced in the outer cylindrical magnetic member 2 by the upper and lower magnetic poles N and S of the inner cylindrical magnetic member 1, and these induced magnetic poles S' and N' and the original magnetic poles N and S attract each other. The force of attraction increases as the magnetic poles N and S and the induced magnetic poles N' and S' become closer to each other; so that once the inner cylindrical magnetic member 1 moves to right or left, the attractive force increases in that direction. This force makes the center point unstable. Letting this force be represented by $F_{x0}'$. it is a force opposite in direction from the force $F_{x0}$ between the magnetic poles N and S. Accordingly, the restoring force $F_{xT}$ as a whole is given by the following expression and is smaller than the original restoring force.

$$F_{xt} = F_{x0} - F_{x0}' \qquad (1)$$

Figure 19B:
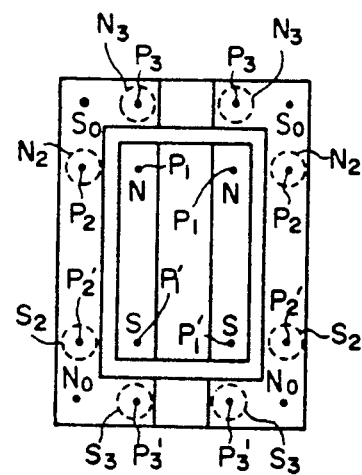

To obviate this defect, according to the present invention, counteracting magnetic poles $N_2$ and $S_2$ reverse in polarity from the induced magnetic poles S' and N' are provided at positions $P_2$ and $P_2'$ where the magnetic poles S' and N' are induced, as shown in FIG. 19B, so that the magnetic poles S', N' and $N_2$ and $S_2$ counteract each other. However, complete counteracting of these magnetic poles is difficult because of their various variations. In view of this, the counteracting magnetic poles $N_2$ and $S_2$ are selected greater in absolute value than the induced magnetic poles S' and N', so that bad influence of large absolute values of the counteracting magnetic poles is eliminated by providing the correcting magnetic poles $N_3$ and $S_3$ at the positions $P_3$ and $P_3'$ where straight lines passing through the magnetic poles N and S cross the outer magnetic member 2.

Now, assuming that the intensities of the induced magnetic poles N' and S' are K times higher than the intensities of the magnetic poles N and S, the induced magnetic poles S' and N' are given by the following expressions:

$$S' = -KN$$

$$N' = -KS \qquad (2)$$

Accordingly, in the case where the canceling magnetic poles $N_2$ and $S_2$ are formed at the positions $P_2$ and $P_2'$ of the induced magnetic poles S' and N', the intensities $m_2$ and $m_2'$) of the resulting magnetic poles at the positions $P_2$ and $P_2'$ are expressed as follows:

$$m_2 = N_2 + S' = N_2(1 - KN/N_2)$$

$$m_2' = S_2 + N'' = S_2(1 - KS/S_2) \qquad (3)$$

where $$1 > KN/N_2$$

$$1 > KS/S_2 \qquad (4)$$

Therefore, the intensities $m_2$ and $m_2'$ are lower than the actual intensities of the magnetic poles $N_2$ and $S_2$.

Next, a description will be given of the restoring force which acts between the inner and outer cylindrical magnetic members 1 and 2 of the noncontact bearing of the present invention. The horizontal force $F_x$ on the inner cylindrical magnetic member 1, obtained with a model of FIG. 4 using the inner and outer cylindrical magnetic members 1 and 2, is given as follows:

$$F_x = 4m_1m_2 \int_0^\pi \int_0^\pi \frac{(R_2\cos\theta_2 - \Delta G)[1 - R_1(X_2^2 + Y_2^2)^{-1/2}]}{[X_2^2 + Y_2^2 + R_1^2 + Z^2 - 2R_1(X_2^2 + Y_2^2)^{1/2}\cos\theta]^{3/2}} d\beta d\theta_2 \qquad (5)$$

where $X_2^2 + Y_2^2 = R_2^2 + \Delta G(\Delta G - 2R_2\cos\theta_2)$

In the above, $R_1$ and $R_2$ are radii of the inner and outer cylindrical members 1 and 2, G is the difference between $R_2$ and $R_1$ and is indicated by $G = R_2 - R_1$, $\Delta G$ is a displacement of the inner cylindrical member 1 in the X direction, and Z is the vertical distance between the magnetic poles of the inner and outer cylindrical members 1 and 2.

Setting $Z = G$ by solving Expression (5) so as to obtain the force $F_x$ in the case where $Z_0^2 = G_0^2$ in the example of FIG. 19A, the force between the upper magnetic poles in the X direction can be obtained. Letting this force be represented by $F_x$ and letting the force between the lower magnetic poles in the X direction, obtained with $Z = -G$, be represented by $F_x'$, the overall restoring force $F_{x0}(\Delta G/G)$ in the X direction in the case where the inner cylindrical member 1 has shifted by ΔG in the X direction is as follows:

$$F_{x0}(\Delta G/G) = F_x + F_x' = 2F_x$$

where $F_x = F_x'$.

Figure 20A:
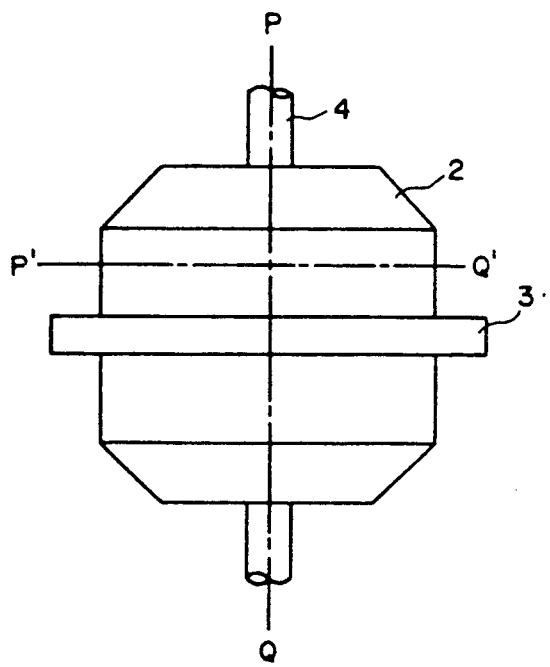
FIGS. 20A, 20B, 20C, 21A, 21B, 21C, 24A, 24B, 25A and 25B are front and sectional views illustrating embodiments of the present invention.
Figure 20B:
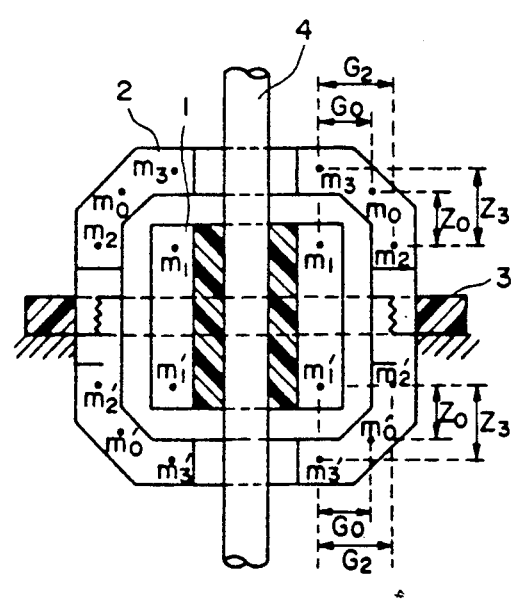
Figure 20C:
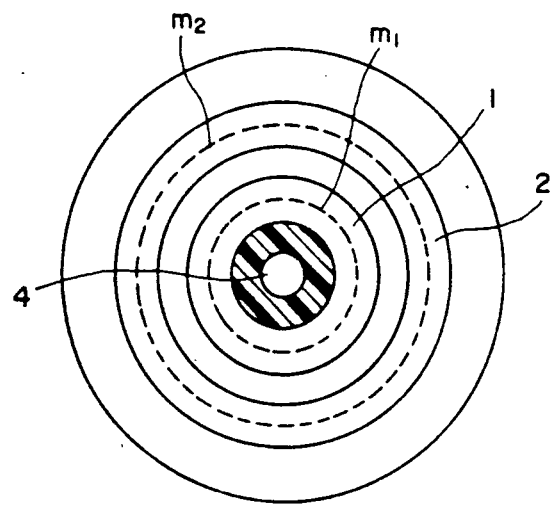
Figure 21A:
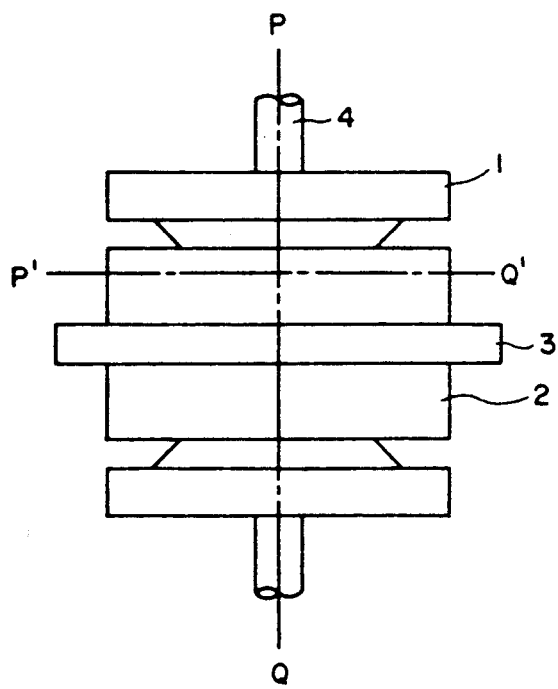
Figure 21B:
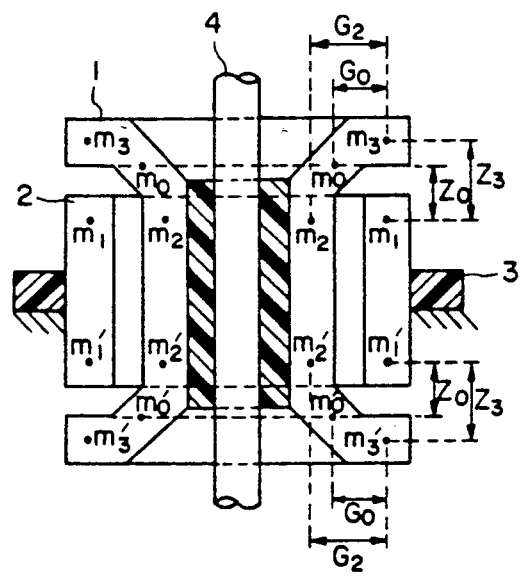
Figure 21C:
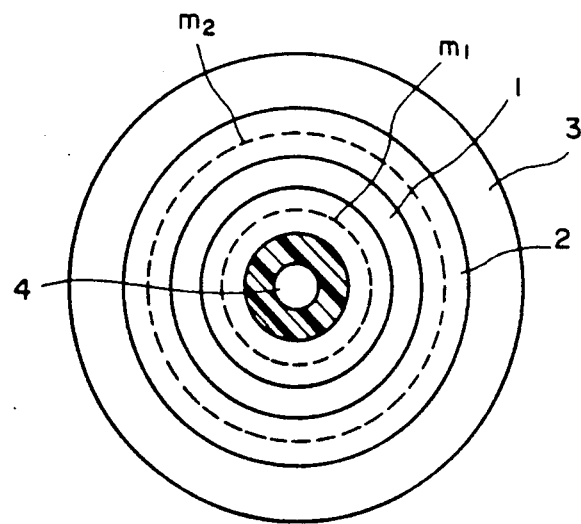

FIGS. 20A, 20B, 20C and 21A, 21B, 21C illustrate embodiments of the present invention, FIGS. 20A and 21A being front views and FIGS. 20B, 20C and FIGS. 21B, 21C sectional views taken along the lines P—Q and P'—Q' in FIGS. 20A and 21A, respectively. Reference numeral 1 indicates an inner cylindrical member, 2 an outer cylindrical member, 3 support means for supporting the outer cylindrical member, and 4 a rotary shaft fixed at the center of the inner cylindrical member 1.

Figure 22:
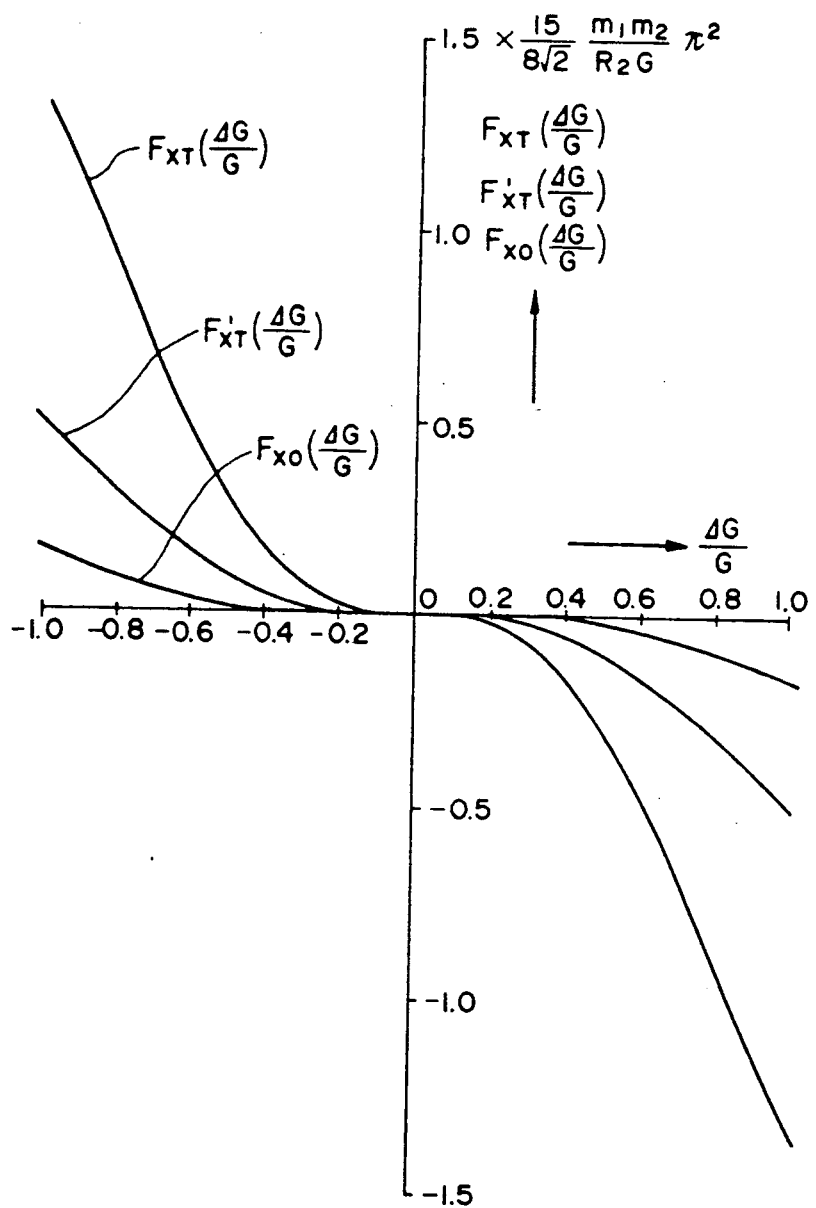

In FIGS. 20A to 21C, (1) $m_2$, $m_3$ and $m_2'$, $m_3'$ are intensities of magnetic poles provided for eliminating the influence of induced magnetic poles; (2) a pair of magnetic poles of intensities $m_0$ and $m_1$ and a pair of magnetic poles of intensities $m_0'$ and $m_1'$ are magnetic poles which attract each other for each pair; (3) a pair of magnetic poles of intensities $m_2$ (or $m_3$) and $m_1$ and a pair of magnetic poles of intensities $m_2'$ (or $m_3'$) and $m_1'$ are magnetic poles which repel each other for each pair; (4) the magnetic poles of intensities $m_0$ and $m_1$ and the magnetic poles of intensities $m_0'$ and $m_1'$ are provided on the circumferences of the outer and inner cylindrical members 2 and 1 at distances of $Z_0 = \pm G/\sqrt{2}$ and $G_0 = G/\sqrt{2}$ in the Z and X directions, respectively; (5) the magnetic poles of intensities $m_2$ and $m_1$ and the magnetic poles of intensities $m_2'$ and $m_1'$ are flush with each other in the Z direction and (6) they are provided on the circumferences of the outer and inner cylindrical members at a distance of $G_2 = G$ in the horizontal direction; (7) the magnetic poles of intensities $m_3$ and $m_1$ and the magnetic poles of intensities $m_3'$ and $m_1'$ lie at the position $Z_3 = \pm G$ in the Z direction and (8) they each lie just above or below the other in the X direction. Accordingly, if the horizontal distance between the magnetic poles is $G_3$, they are disposed on the circumferences of the inner and outer cylindrical members at a distance $G_3 = 0$. The restoring force in the case where the intensities $m_0$ and $m_0'$ of the magnetic poles are twice higher than the intensities $m_1$ and $m_1'$ and the intensities $m_2$, $m_3$ and $m_2'$, $m_3'$ of the magnetic poles are equal to the intensities $m_1$ and $m_1'$ is represented by $F_{xT}(\Delta G/G)$. The restoring force in the case where the intensities $m_0$ and $m_0'$ of $F_{xT}(\Delta G/G)$ are equal to zero is represented by $F_{xT}'(\Delta G/G)$. FIG. 22 shows the restoring forces $F_{x0}(\Delta G/G)$, $F_{xT}'(\Delta G/G)$ and $F_{xT}(\Delta G/G)$ against $\Delta G/G$.

From FIG. 22 it appears that $F_{x0}(\Delta G/G)$, $F_{xT}'(\Delta G/G)$ and $F_{xT}(\Delta G/G)$ all have the restoring force to the origin and that $F_{xT}(\Delta G/G)$ and $F_{xT}'(\Delta G/G)$ in the case where the magnetic poles for eliminating the influence of the induced magnetic poles are provided are greater in the restoring force than $F_{x0}(\Delta G/G)$. Moreover, $F_{xT}(\Delta G/G)$ in the case where the intensities $m_0$ and $m_0'$ of the magnetic poles are not zero is greater in the restoring force than $F_{xT}'(\Delta G/G)$ in the case where the above-mentioned intensities are zero.

Figure 23:
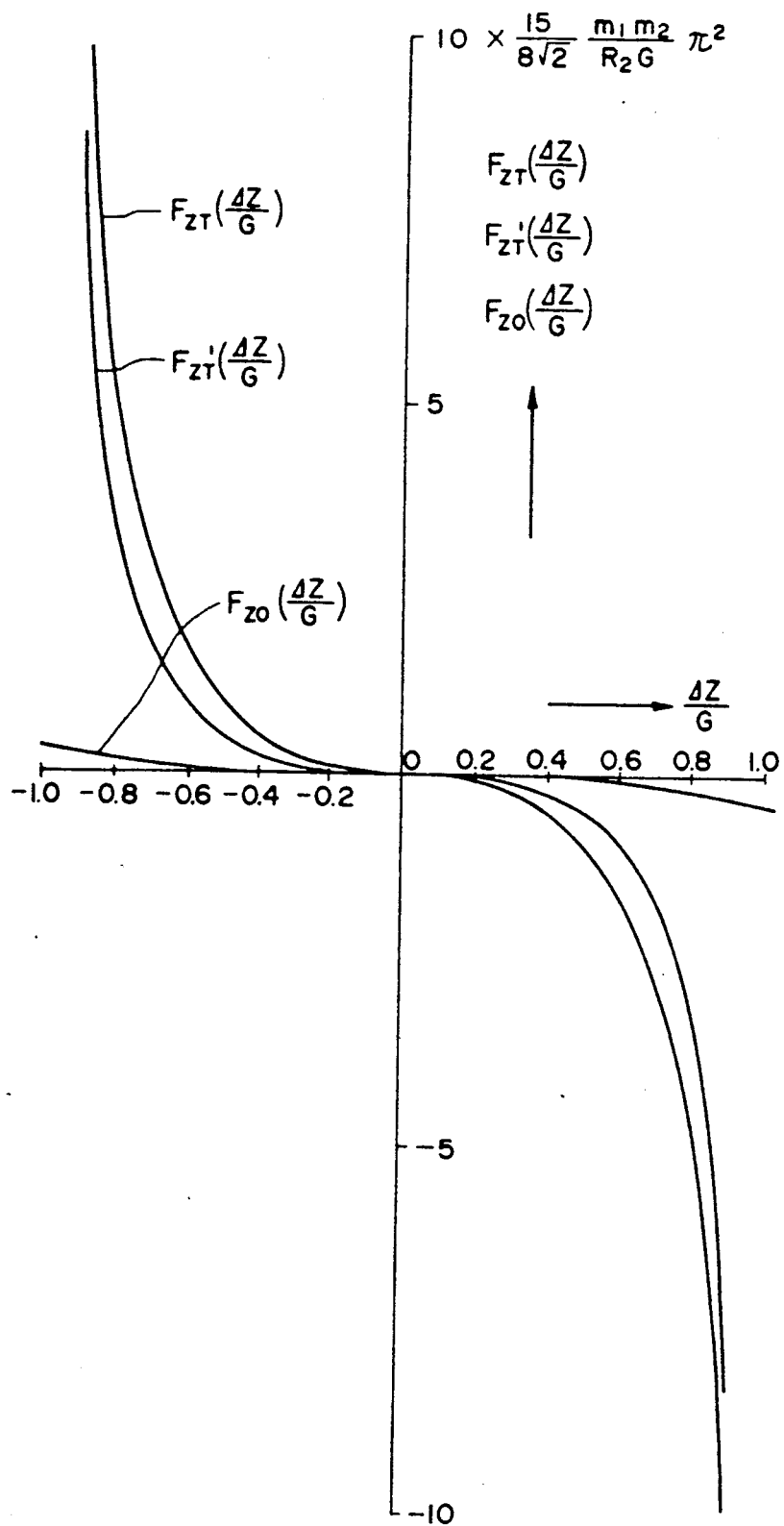
FIG. 23 is a graph showing the vertical restoring force in the present invention.
Figure 24A:
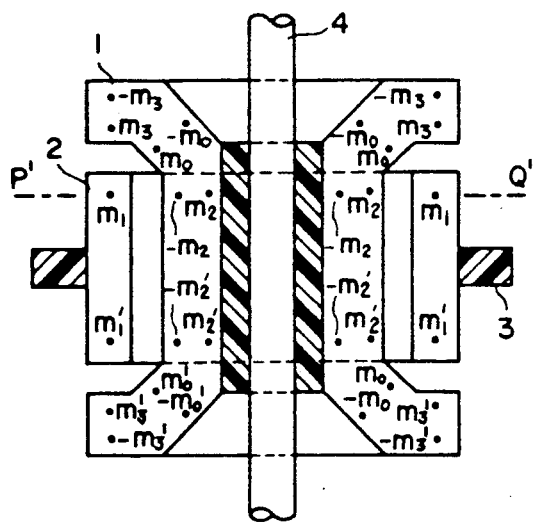

In FIG. 23 there are shown, against Z/G, forces $F_{z0}(\Delta Z/G)$ and $F_{zT}(\Delta Z/G)$ in the Z direction when the inner cylindrical member 1 shifted by ΔZ in the Z direction in the embodiments of FIGS. 20A, 20B, 20C and FIGS. 21A, 21B, 21C, obtained in the same manner as mentioned above, and a force $F_{zT}'(\Delta Z/G)$ in the case where the intensities $m_0$ and $m_0'$ of the magnetic poles are zero. It is seen from FIG. 23 that the restoring force in the Z direction acts toward the origin. Also in this instance, $F_{zT}'(\Delta Z/G)$ and $F_{zT}(\Delta Z/G)$ in the case where the magnetic poles for eliminating the influence of the induced magnetic poles are provided are greater in the restoring force than $F_{z0}(\Delta Z/G)$, and the restoring force is greater in the case where the intensities $m_0$ and $m_0'$ of the magnetic poles are not zero than in the case where they are zero. The inner cylindrical member 1 floats by virtue of the restoring force and the center shaft 4 can be held rotatable by proper external drive means.

FIGS. 24A, 24B, 25A, 25B and FIG. 26 are sectional views of other embodiments of the invention. In the embodiments illustrated in FIGS. 20A, 20B, 20C, FIGS. 21A, 21B, 21C and FIG. 26 the magnetic poles are provided by magnetizing the inner and outer magnetic members 1 and 2 along their surfaces, but in the FIG. 8 and 9 embodiments the magnetic poles are provided by magnetizing the magnetic member 1 or 2 thickwise thereof.

Figure 26:
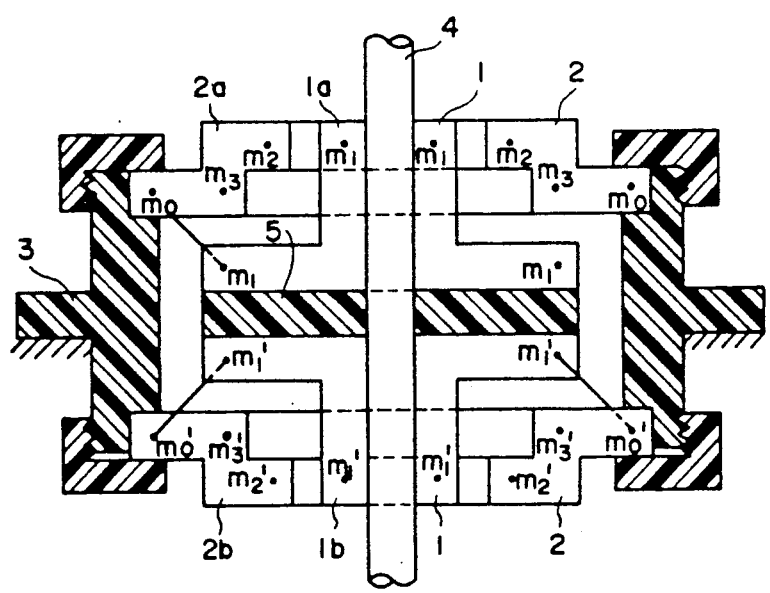
FIGS. 26, 27A and 27B are front views, partly in section, illustrating other embodiments of the present invention.

In the embodiment shown in FIG. 26 the inner and outer magnetic members 1 and 2 are composed of inner magnetic members 1a and 1b and outer magnetic members 2a and 2b which are divided lengthwise of the rotary shaft 4, respectively, and the two inner magnetic members 1a and 1b are coupled together by a nonmagnetic coupler 5 disposed between them. The two outer magnetic members 2a and 2b are coupled together by a nonmagnetic support 3 disposed intermediate between them. This structure affords reduction of the amount of magnetic material used and permits easy fabrication of the bearings.

Figure 25A:
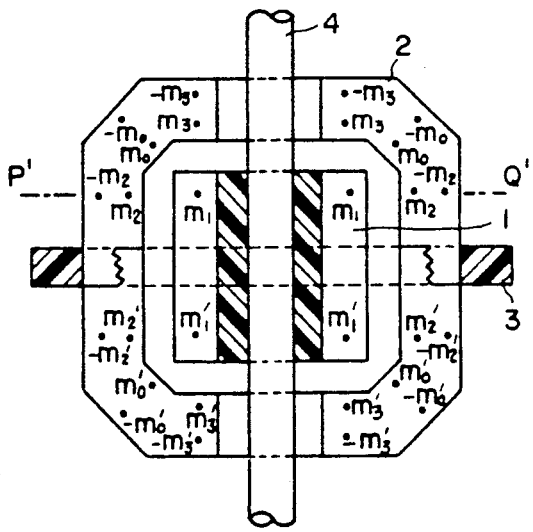
Figure 24B:
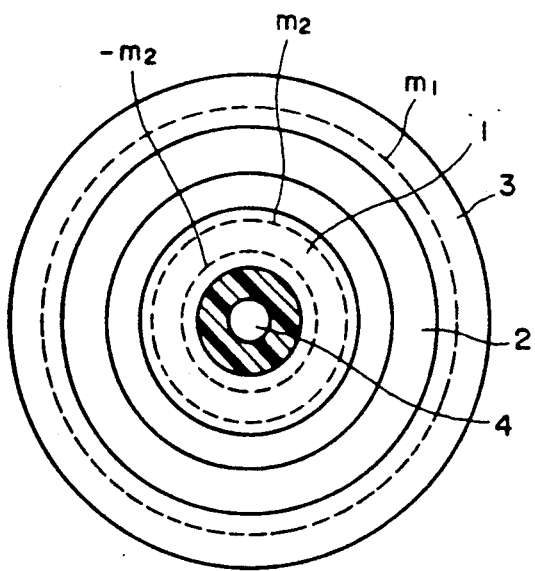
Figure 25B:
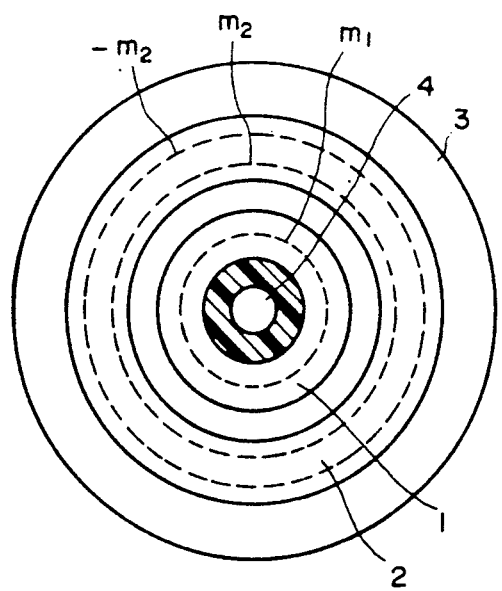
Figure 27A:
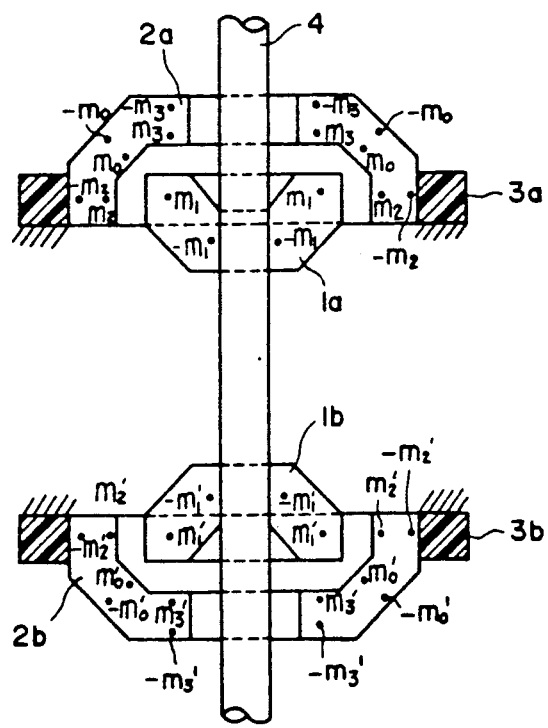
Figure 27B:
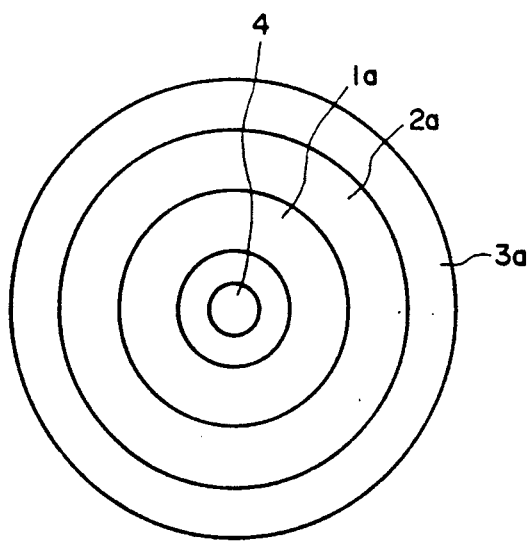

As will be seen from the embodiment of FIG. 26, the structure in each of the foregoing embodiments can be divided into two in the lengthwise direction of the rotary shaft 4 and respective magnetic members can be spaced apart as exemplified in FIGS. 27A and 27B. In the embodiment shown in FIGS. 27A and 27B the structure of the FIGS. 25A and 25B is divided into two in the lengthwise direction of the rotary shaft and the respective magnetic members are spaced apart. This effectively prevents centrifugal whirling of the rotary shaft 4, and hence affords appreciable reduction of the number of bearings used.

The above mentioned decrease of the restoring force can be improved by the following embodiments of the present invention.

Figure 28:
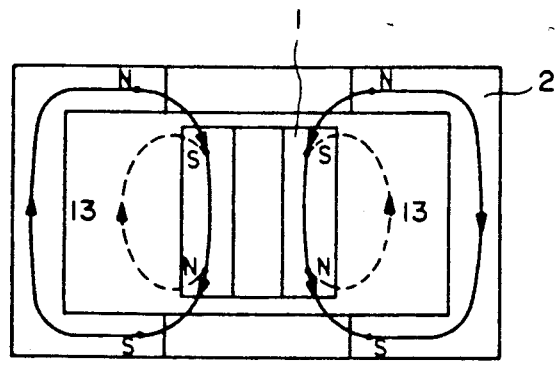
FIGS. 28, 29 and 30 are longitudinal sections illustrating other embodiments of the present invention.

In FIGS. 28, an air gap 13 provided between an inner cylindrical member 1 and an outer cylindrical member 2 is made to be wider than that of the example shown in FIG. 2C, so that the intensities of induced magnetic poles is suppressed to be negligible.

Since a magnetic flux shown by a dotted line in FIG. 28 passes through the air gap 13 other than the outer cylindrical member 2, it will be understood that the intensities of induced magnetic poles are also reduced. By suppressing effects of the induced magnetic poles, the decrease of the restoring force can be avoided. Either the inner cylindrical member 1 or the outer cylindrical member 2 can be fixed to a supporting member to provide a noncontact bearing of the present invention.

Figure 29:
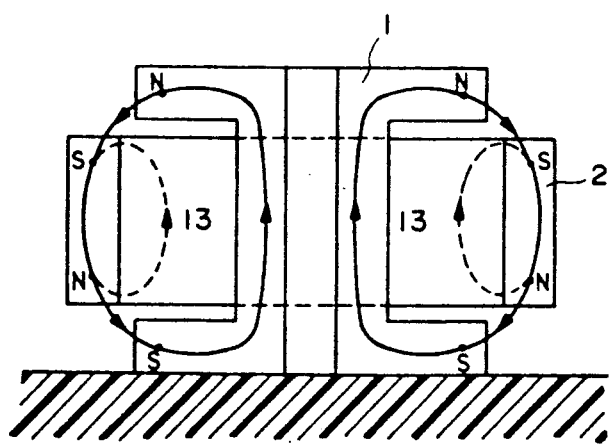

In FIG. 29 illustrating another embodiment of the present invention, the longitudinal length of the inner cylindrical member 1 is longer than that of the outer cylindrical member 2 to differentiate from the example shown in FIGS. 2A and 2B. The inner cylindrical member 1 is supported by a suitable support member.

Figure 30:
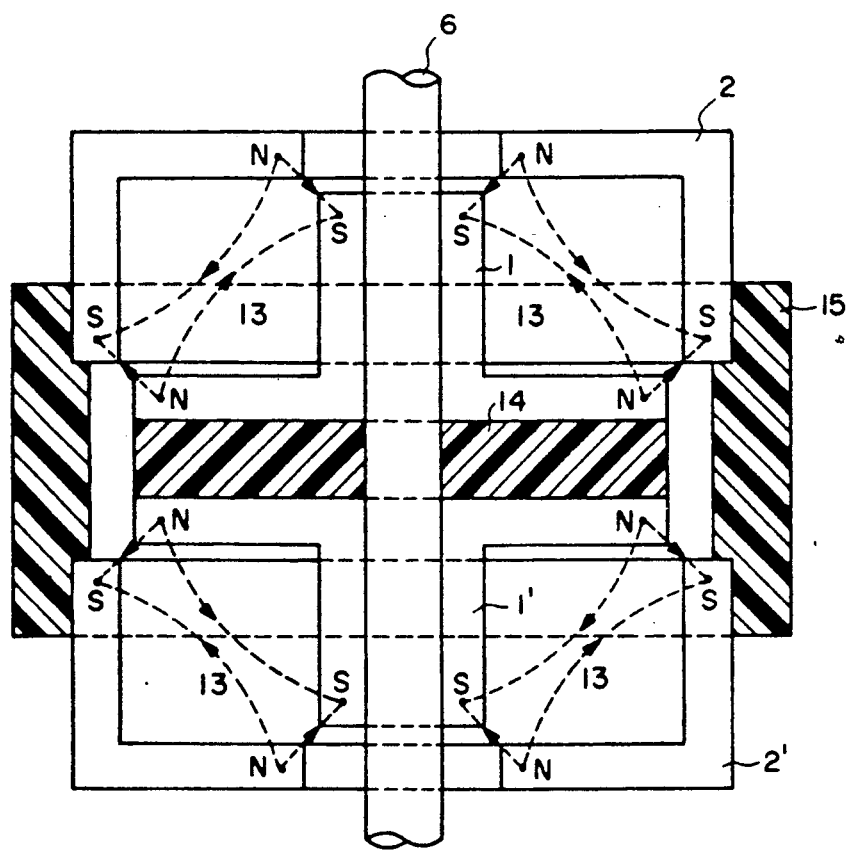

In FIG. 30 illustrating a last embodiment of the invention, two noncontact bearings provided at the upper portion and at the lower portion, respectively, of a rotatable shaft 6 are mutually connected by the use of non-magnetic members 14 and 15. Since a wide air gap 13 is provided, undersirable effect by induced magnetic poles can be eliminated. The present embodiment has the saving of magnetic material and the readiness of manufacturing processes due to separate location of magnetic material by the use of the nonmagnetic members 14 and 15.

It is not necessary that the nonmagnetic member 15 is a unitary body. In this case, the outer cylindrical member 2 of the upper side can be separately provided from the outer cylindrical member 2' of the lower side. The non-magnetic material 14 may be removed.

As will be appreciated from the above, the present invention offers a bearing structure in which the shaft and the bearing stay out of contact with each other and have the restoring force toward their center and, at the same time, the shaft is floating from the bearing stay. The bearing of the present invention, when employed in an automatically controlled mechanism, in particular, will permit control of rotation and axial movement, because it is free from static friction.

As described above, the present invention offers an excellent noncontact bearing which is free from the influence of induced magnetic poles and hence provides a great restoring force in the horizontal and vertical directions.

What I claim is:

1. A noncontact bearing utilizing magnetism comprising:
   a first cylindrical or rod-like magnetic member magnetized axially thereof;
   a second cylindrical magnetic member disposed outside said first magnetic member in adjacent but slightly spaced relation thereto, magnetized in its axial direction reversed from the direction of magnetization of said first magnetic member and slightly different therefrom in length; and
   support means for supporting one of said first and second magnetic members without impeding the rotation of the other about its axis;
   wherein said one of said first and second magnetic members is used as a rotary shaft.

2. A noncontact bearing according to claim 1, which further comprises a third cylindrical magnetic member disposed outside said second magnetic member in adjacent but slightly spaced relation thereto, magnetized in its axial direction reversed from the direction of magnetization of said second magnetic member, and slightly different therefrom in length, and wherein said support means supports said first and third magnetic members without impeding the rotation of said second magnetic member about its axis.

3. A noncontact bearing according to claim 1 or 2, wherein said first and second magnetic members are disposed horizontally and auxiliary magnet members are mounted on said first or second magnetic member at its both ends for emanating magnetic force which counteracts gravity acting on said first magnetic member used as a rotary shaft.

4. A noncontact bearing according to claim 1 or 2, wherein said first and second magnetic members are disposed vertically and each have three or more magnetic poles for emanating magnetic force which counteracts gravity acting on said first magnetic member used as a rotary shaft.

5. A noncontact bearing utilizing magnetism, comprising:
   a first cylindrical or rod-like magnetic member having magnetic poles continuously arranged on the circumference of its cross-section;
   a second cylindrical or bar-shaped magnetic member disposed inside or outside said first magnetic member in adjacent but closely spaced relation thereto, having magnetic poles continuously arranged on the circumference of its cross-section and having a second opposite polarity magnetic pole spacing slightly different from a first opposite polarity magnetic pole spacing of said first magnetic member; and
   support means for supporting one of said first second magnetic members without impeding the rotation of the other about its axis;
   wherein said second magnetic member has counteracting magnetic poles of the same spacing as said first opposite polarity magnetic pole spacing of said first magnetic member and facing magnetic poles of said first magnetic member, for counteracting the influence of magnetism induced by said magnetic poles of said first magnetic member and said second magnetic member, having at positions where straight lines passing through said magnetic poles of opposite polarities in said first magnetic member cross said second magnetic member, correcting magnetic poles for preventing the influence of magnetism induced by said magnetic poles of said first magnetic member;
   and a rotary shaft provided at the center of said one of said first and second magnetic members.

6. A noncontact bearing according to claim 5, wherein said first and second magnetic members are each magnetized along their surfaces to form said magnetic poles.

7. A noncontact bearing according to claim 5, wherein said first magnetic member is magnetized along its surface to form said magnetic poles and said second magnetic member is magnetized widthwise thereof to form said magnetic poles.

8. A noncontact bearing according to claim 5, 6 or 7, wherein said first and second magnetic members are each divided into two lengthwise of said rotary shaft and are together by a nonmagnetic coupler.

9. A noncontact bearing according to claim 7 or wherein said first and second magnetic members are each divided into two lengthwise of said rotary shaft and are supported to said rotary shaft or support means.

10. A noncontact bearing utilizing magnetism comprising:
   a first magnetic member formed into a solid of revolution and having magnetic poles each continuously allocated on a circumference of a cross-section thereof by magnetizing longitudinally thereof;
   a second cylindrical magnetic member disposed inside or outside said first magnetic member in adjacent but slightly spaced relation to an edge of a cross-section thereof at the allocation position of the magnetic poles of the fist magnetic member, and magnetized in its longitudinal direction to provide along a circumference continuous allocation of magnetic poles of different polarities from the polarities of the magnetic poles of the first magnetic member; and support means for supporting one of said first magnetic member and said second magnetic member without impeding the rotation of the other magnetic member about it axis;

and the first magnetic member and the second magnetic member are formed so that the magnetic poles of different polarities disposed on the first magnetic member and the second magnetic member respectively are close to each other, and so that magnetic members each disposed at respective intermediate positions between two magnetic poles at each of the first magnetic member and the second magnetic member are separated by a relatively wide air gap therebetween.

* * * * *